(12) United States Patent
Yokomitsu et al.

(10) Patent No.: US 10,356,369 B2
(45) Date of Patent: *Jul. 16, 2019

(54) WEARABLE CAMERA

(71) Applicant: Panasonic Intellectual Property Management Co., Ltd., Osaka (JP)

(72) Inventors: Yasushi Yokomitsu, Fukuoka (JP); Haruo Tagawa, Fukuoka (JP); Ryoko Tanabiki, Fukuoka (JP); Kazuhiko Yamaguchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 195 days.

This patent is subject to a terminal disclaimer.

(21) Appl. No.: 15/466,359

(22) Filed: Mar. 22, 2017

(65) Prior Publication Data

US 2017/0195635 A1    Jul. 6, 2017

Related U.S. Application Data

(63) Continuation of application No. 14/936,230, filed on Nov. 9, 2015, now Pat. No. 9,661,283.

(30) Foreign Application Priority Data

Dec. 24, 2014 (JP) .................................. 2014-261174
Dec. 24, 2014 (JP) .................................. 2014-261175
(Continued)

(51) Int. Cl.
*G06K 9/00*    (2006.01)
*H04N 5/77*    (2006.01)
(Continued)

(52) U.S. Cl.
CPC ......... *H04N 7/181* (2013.01); *G06K 9/00664* (2013.01); *G06K 9/00718* (2013.01);
(Continued)

(58) Field of Classification Search
CPC combination set(s) only.
See application file for complete search history.

(56) References Cited

U.S. PATENT DOCUMENTS 6,563,532 B1    5/2003  Strub et al.
7,803,191 B2    9/2010  Biedermann et al.
(Continued)

FOREIGN PATENT DOCUMENTS

JP    2003-274327 A    9/2003
JP    2003-274360 A    9/2003
(Continued)

OTHER PUBLICATIONS

POC.1.5 User Manual, 2008 at http://www.vio-pov.com/marketing/files/manuals/POC15_User_Manual.pdf, 34 pages.
(Continued)

*Primary Examiner* — Mohammed S Rahaman
(74) *Attorney, Agent, or Firm* — Seed IP Law Group LLP

(57) ABSTRACT

A capture, a storage that stores data of a video image captured by the capture, an attribute information assigning switch that inputs an operation of assigning attribute information related to the data of a video image, and an attribute selecting switch that inputs an operation of selecting the attribute information are included. When there is an input from the attribute information assigning switch, the attribute information associated with a setting state of the attribute selecting switch is stored in the storage by being assigned to data of a video image.

8 Claims, 27 Drawing Sheets

(30) Foreign Application Priority Data

Dec. 24, 2014 (JP) ................................ 2014-261176
Dec. 26, 2014 (JP) ................................ 2014-265962

(51) Int. Cl.
*H04N 7/18* (2006.01)
*H04N 9/82* (2006.01)
*H04N 5/232* (2006.01)
*H04N 5/907* (2006.01)

(52) U.S. Cl.
CPC ......... *H04N 5/232* (2013.01); *H04N 5/23206* (2013.01); *H04N 5/77* (2013.01); *H04N 5/772* (2013.01); *H04N 5/907* (2013.01); *H04N 7/185* (2013.01); *H04N 9/8205* (2013.01); *H04N 2213/001* (2013.01)

(56) References Cited

U.S. PATENT DOCUMENTS

| | | | |
|---|---|---|---|
| 8,781,292 | B1 | 7/2014 | Ross et al. |
| 8,900,308 | B2 | 12/2014 | Biedermann et al. |
| 2001/0019657 | A1* | 9/2001 | McGrath .............. G11B 27/028 386/331 |
| 2003/0215010 | A1 | 11/2003 | Kashiwa |
| 2007/0031117 | A1* | 2/2007 | Abe ..................... G11B 27/034 386/278 |
| 2008/0030580 | A1* | 2/2008 | Kashiwa .......... G08B 13/19621 348/158 |
| 2008/0039948 | A1 | 2/2008 | Biedermann et al. |
| 2008/0068461 | A1* | 3/2008 | Izakov ................. G07C 5/0891 348/148 |
| 2008/0170130 | A1* | 7/2008 | Ollila ................... H04N 5/2252 348/211.99 |
| 2009/0251545 | A1* | 10/2009 | Shekarri ................ G06Q 10/00 348/158 |
| 2010/0305707 | A1 | 12/2010 | Biedermann et al. |
| 2011/0018998 | A1* | 1/2011 | Guzik .................... H04N 21/21 348/143 |
| 2011/0057783 | A1 | 3/2011 | Yagi et al. |
| 2012/0206607 | A1 | 8/2012 | Morioka |
| 2015/0054716 | A1* | 2/2015 | Hirabayashi ....... G02B 27/0093 345/8 |
| 2015/0086175 | A1* | 3/2015 | Lorenzetti ............ H04N 9/8211 386/226 |
| 2015/0182349 | A1 | 7/2015 | Biedermann et al. |
| 2016/0173832 | A1 | 6/2016 | Stewart et al. |
| 2016/0182580 | A1 | 6/2016 | Thompson |

FOREIGN PATENT DOCUMENTS

| | | | |
|---|---|---|---|
| JP | 2004-200997 | A | 7/2004 |
| JP | 2006-148842 | A | 6/2006 |
| JP | 2007-221328 | A | 8/2007 |
| JP | 2007235239 | A * | 9/2007 |
| JP | 2008-529354 | A | 7/2008 |
| JP | 2009-060164 | A | 3/2009 |
| JP | 2010-268128 | A | 11/2010 |
| JP | 2011-199562 | A | 10/2011 |
| JP | 2012-147167 | A | 8/2012 |
| JP | 2012-156571 | A | 8/2012 |
| JP | 2007-235239 | A | 7/2013 |
| JP | 2013-163032 | A | 8/2013 |
| JP | 2015-031902 | A | 2/2015 |
| JP | 2015-041969 | A | 3/2015 |
| WO | 2006-081053 | A2 | 8/2006 |

OTHER PUBLICATIONS

"Wearable Camera systems," System Assessment, Homeland Security, Mar. 2012 at http:storage.vievu.com/web/documents/Wearable-Camera-Systems_SUM.pdf, 8 pages.

* cited by examiner

| STATE OF ATTRIBUTE SELECTING SWITCH | ATTRIBUTE INFORMATION |
|---|---|
| C1 | TRAFFIC ACCIDENT |
| C2 | DRUNKEN DRIVING |
| C3 | SPEEDING |

FIG. 9

| EVENT ID | TIME INFORMATION | CAMERA ID | USER ID | ATTRIBUTE INFORMATION | GPS INFORMATION | ... |
|---|---|---|---|---|---|---|
| Event001 | 2014/12/01 12:00:00 | BWC0001 | User00123 | SPEEDING | 35° 41' 22" N 139° 41' 30" E | ... |
| Event002 | 2014/12/01 12:05:30 | BWC0001 | User00123 | DRUNKEN DRIVING | 35° 41' 22" N 139° 41' 30" E | ... |
| ... | ... | ... | ... | ... | ... | ... |

FIG. 11

| EVENT ID | TIME INFORMATION | CAMERA ID | USER ID | ATTRIBUTE INFORMATION | GPS INFORMATION | ... |
|---|---|---|---|---|---|---|
| Event001 | 2014/12/01 12:00:00 | BWC0001 | User00123 | SPEEDING | 35° 41' 22" N 139° 41' 30" E | ... |
|  | 2014/12/01 12:05:30 | BWC0001 | User00123 | DRUNKEN DRIVING | 35° 41' 22" N 139° 41' 30" E | ... |
| Event002 | 2014/12/01 12:20:00 | BWC0001 | User00123 | SPEEDING | 35° 42' 30" N 139° 41' 20" E | ... |
| ... | ... | ... | ... | ... |  | ... |

FIG. 13
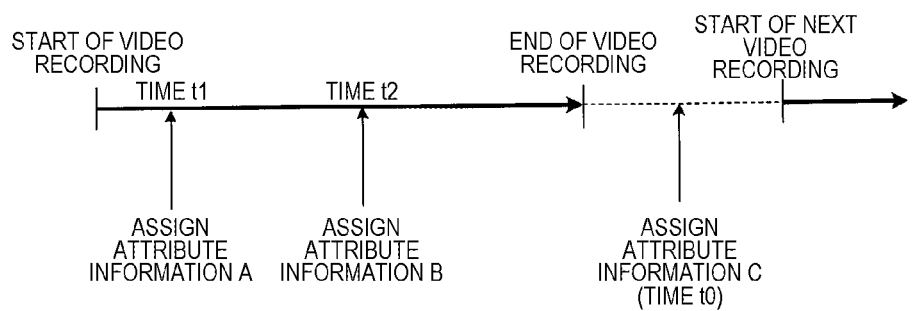
FIG. 14
| ATTRIBUTE INFORMATION | TRANSMISSION DESTINATION |
|---|---|
| TRAFFIC ACCIDENT | Server-1 |
| DRUNKEN DRIVING | Server-2 |
| SPEEDING | Server-3 |
FIG. 15
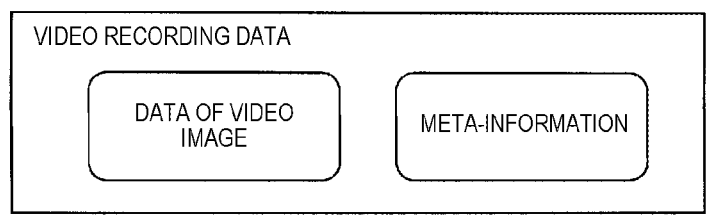

FIG. 16

| EVENT ID | TIME INFORMATION | CAMERA ID | USER ID | PRIORITY | ATTRIBUTE INFORMATION | GPS INFORMATION | ... |
|---|---|---|---|---|---|---|---|
| Event001 | 2014/12/01 12:00:00 | BWC0001 | User00123 | | SPEEDING | 35° 41' 22" N 139° 41' 30" E | ... |
| Event002 | 2014/12/01 12:05:30 | BWC0001 | User00123 | | DRUNKEN DRIVING | 35° 41' 22" N 139° 41' 30" E | ... |
| Event003 | 2014/12/01 20:10:12 | BWC0001 | User00123 | High | TRAFFIC ACCIDENT | 35° 42' 30" N 139° 41' 20" E | ... |
| .. | .. | .. | .. | | .. | | .. |

| STATE OF ATTRIBUTE SELECTING SWITCH | ATTRIBUTE INFORMATION |
|---|---|
| C1 | TRAFFIC ACCIDENT |
| C2 | DRUNKEN DRIVING |
| C3 | SPEEDING |

FIG. 28

| EVENT ID | TIME INFORMATION | CAMERA ID | USER ID | VIDEO RECORDING CAMERA INFORMATION | ATTRIBUTE INFORMATION | GPS INFORMATION | |
|---|---|---|---|---|---|---|---|
| Event001 | 2014/12/01 12:00:00 | BWC0001 | User00123 | FIRST CAMERA (SECOND → FIRST) | SPEEDING | 35° 41'22" N 139° 41'30" E | ... |
| Event002 | 2014/12/01 12:05:30 | BWC0002 | User00123 | SECOND CAMERA (FIRST → SECOND) | DRUNKEN DRIVING | 35° 41'22" N 139° 41'30" E | ... |
| Event003 | 2014/12/01 20:10:12 | BWC0001 | User00123 | FIRST CAMERA (FIRST ONLY) | TRAFFIC ACCIDENT | 35° 42'30" N 139° 41'20" E | ... |
| Event004 | 2014/12/02 22:00:10 / 2012/12/02 22:10:50 | BWC0001 / BWC0002 | User00123 | FIRST CAMERA / SECOND CAMERA | SPEEDING / DRUNKEN DRIVING | 35° 42'54" N 138° 41'67" E | ... |
| .. | .. | .. | .. | .. | .. | .. | .. |

FIG. 30

| EVENT ID | TIME INFORMATION | CAMERA ID | USER ID | VIDEO RECORDING CAMERA INFORMATION | ATTRIBUTE INFORMATION | GPS INFORMATION | ... |
|---|---|---|---|---|---|---|---|
| Event001 | 2014/12/01 12:00:00 | BWC0001 | User00123 | FIRST CAMERA (FIRST ONLY) | SPEEDING | 35° 41'22" N 139° 41'30" E | ... |
| Event002 | 2014/12/01 12:05:30 | BWC0001 +BWC0002 | User00123 | FIRST CAMERA +SECOND CAMERA | DRUNKEN DRIVING | 35° 41'22" N 139° 41'30" E | ... |
| Event003 | 2014/12/01 20:10:12 | BWC0001 | User00123 | FIRST CAMERA (FIRST ONLY) | TRAFFIC ACCIDENT | 35° 42'30" N 139° 41'20" E | ... |
| Event004 | 2014/12/02 22:00:10 / 2012/12/02 22:10:50 | BWC0001 / BWC0001 +BWC0002 | User00123 | FIRST CAMERA / FIRST CAMERA +SECOND CAMERA | SPEEDING / DRUNKEN DRIVING | 35° 42'54" N 138° 41'67" E | ... |
| ... | ... | ... | ... | ... | ... | ... | ... |

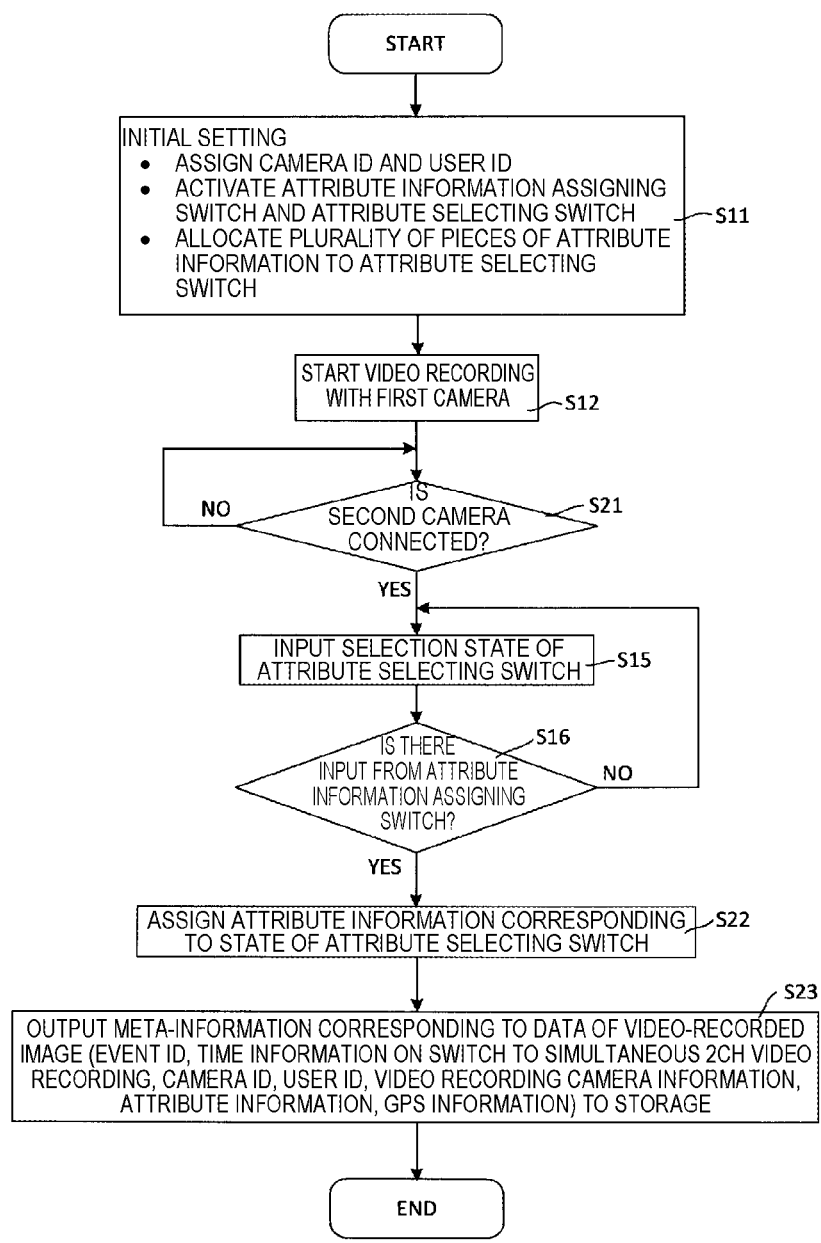

WEARABLE CAMERA

This is a continuation application of U.S. Ser. No. 14/936,230 filed Nov. 9, 2015, which is based on Japanese Application No. 2014-261174 filed Dec. 24, 2014, Japanese Application No. 2014-261175 filed Dec. 24, 2014, Japanese Application No. 2014-261176 filed Dec. 24, 2014, and Japanese Application No. 2014-265962 filed Dec. 26, 2014, the entire contents of each of which are incorporated by reference herein.

BACKGROUND OF THE INVENTION

1. Field of the Invention

The present invention relates to a wearable camera which is an image capturing device, for example, which can be equipped on a human body or worn clothes.

2. Description of the Related Art

In recent years, introduction of a wearable camera which is equipped by a police officer or a security guard and used in order to support duties of the police officer or the security guard, for example, has been taken into consideration.

As an example in the related art applied with the wearable camera, Japanese Patent Unexamined Publication No. 2006-148842 discloses a wearable monitoring camera system, for example. The wearable monitoring camera system has a configuration in which a video image signal and an audio signal from body-equipped CCD camera means and microphone means, and a date and time information signal from built-in clock means are encoded by encode server means which is accommodated in body-equipped pouch means, and the date and time information converted into character information can be recorded by superimposing on a captured video image.

In a wearable camera system, when recording and retaining data of a captured video image, as in the system disclosed in Japanese Patent Unexamined Publication No. 2006-148842, for example, a video image signal and date and time information are recorded by being associated with each other so that data of a target video image can be extracted and searched for when reproducing data of a video-recorded image in the future. For example, in addition to the date and time information, if various types of attribute information such as information indicating contents of a captured video image are assigned by being associated with data of a video image, the data of the target video image can be easily extracted and searched for, thereby being convenient.

However, when assigning the attribute information to data of a video image, assigning is performed after the data of a video-recorded image which is video-recorded by the wearable camera is reproduced by using a personal computer (PC) or the like and contents of the video image are checked. Therefore, time and labor are required when assigning the attribute information. Particularly, in regard to the wearable camera system which is applied to duties of a police officer or a security guard, video images are often captured in an emergency situation, thereby resulting in disadvantages on a managerial side of data of a video-recorded image, such as difficulties in assigning of attribute information performed by a PC, and difficulties in distinguishing video images later.

SUMMARY OF THE INVENTION

An object of the present invention is to provide a wearable camera in which the convenience at the time of handling data of a captured video image can be improved.

According to an aspect of the present invention, there is provided a wearable camera including a capture that captures a video image of a scene, a storage that stores data of a video image captured by the capture, and an operation input section that inputs an operation performed by a user. The operation input section includes an attribute selecting switch that selects any one among a plurality of pieces of attribute information which is classification information indicating contents of the data of a video image and causes the selected attribute information to be a setting state, and an attribute information assigning switch that assigns the attribute information caused to be the setting state. In response to an operation of the attribute information assigning switch performed during a session from a start of video image data recording till a start of next video image data recording, the storage stores data of a video image which is currently video-recorded or data of a video image which is video-recorded immediately before, by associating the attribute information caused to be the setting state by the attribute selecting switch therewith.

According to the present invention, it is possible to improve the convenience at the time of handling data of a captured video image in a wearable camera system.

BRIEF DESCRIPTION OF DRAWINGS

FIG. 9 is a diagram illustrating an example of data structure of a video-recorded image list, according to a first exemplary example of the present invention;

FIG. 11 is a diagram illustrating an example of data structure of the video-recorded image list, according to a second exemplary example of the present invention;

FIG. 13 is a diagram illustrating a time chart showing an example of the attribute information assigning operation, according to the second exemplary example of the present invention;

FIG. 14 is a diagram illustrating an example of setting of a transmission destination of the data of a video image in accordance with the attribute information, according to a third exemplary example of the present invention;

FIG. 15 is a diagram illustrating an example of data structure of the video recording data, according to the third exemplary example of the present invention;

FIG. 16 is a diagram illustrating an example of data structure of the video-recorded image list, according to the third exemplary example of the present invention;

FIG. 28 is a diagram illustrating a first example of the video-recorded image list, according to the fourth exemplary example of the present invention;

FIG. 30 is a diagram illustrating a second example of the video-recorded image list, according to the fourth exemplary example of the present invention; and FIG. 31 is a flow chart illustrating an example of an operational procedure of the wearable camera system in which video recording is switched over to simultaneous two-channel video recording and common attribute information is assigned to each piece of the video recording data video-recorded by each of the wearable cameras applied to the simultaneous two-channel video recording, according to the fourth exemplary example of the present invention.

DETAILED DESCRIPTION OF THE PREFERRED EMBODIMENT

Hereinafter, with reference to the drawings, descriptions will be given in detail regarding an exemplary embodiment (hereinafter, referred to as "the present exemplary embodiment") in which a wearable camera, and a wearable camera system that uses the wearable camera are specifically disclosed according to the present invention.

Figure 1:
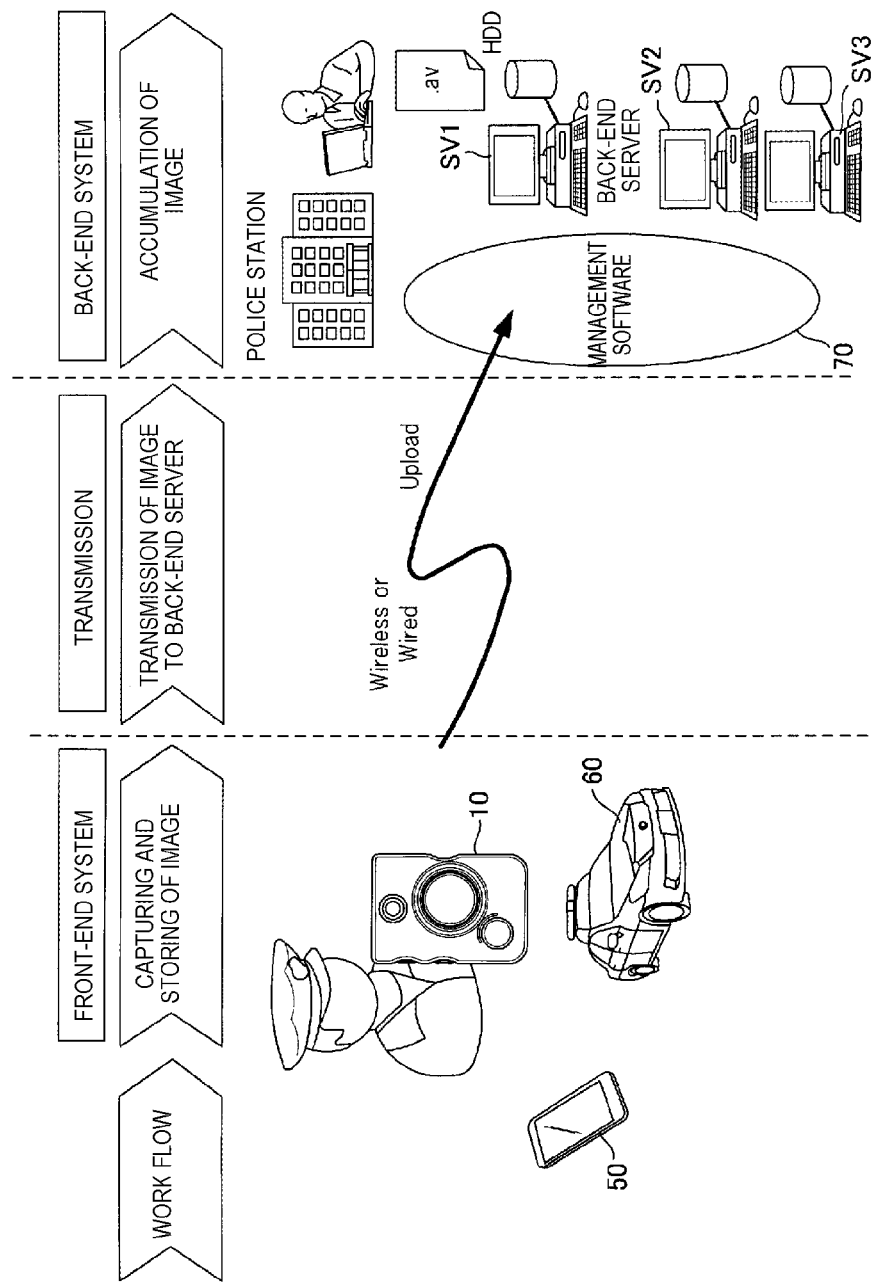
FIG. 1 is an explanatory diagram regarding an overview of a wearable camera system and usage of data of a video image captured by the wearable camera, according to an exemplary example of the present invention.

FIG. 1 is an explanatory diagram regarding an overview of the wearable camera system and usage of data of a video image captured by the wearable camera, according to the present exemplary embodiment. Wearable camera 10 according to the present exemplary embodiment is an image capturing device which can be equipped by a user on one's body, worn clothes, or the like. Wearable camera 10 has a communication function for communicating with portable terminal 50 such as a smart phone, in-car system 60 mounted in a vehicle, and servers (back-end servers) SV1, SV2, and SV3 in a user's organization. In the wearable camera system, a front-end system is configured to include wearable camera 10, portable terminal 50, and in-car system 60, and a back-end system is configured to include management software 70 for a network, and servers SV1, SV2, and SV3.

Here, descriptions will be given assuming a case of being used in a police station, as an example of the wearable camera system according to the present exemplary embodiment. In this case, a police officer who is a user performs image capturing by using wearable camera 10. For example, data of a captured video image is transmitted to the back-end system in a police station and is accumulated therein. Wearable camera 10 does not limit a user to a police officer. Wearable camera 10 may also be used in other various places of work (for example, a security company).

The front-end system illustrated in FIG. 1 includes wearable camera 10 which can be equipped by a police officer when being dispatched to the front lines of the scene, portable terminal 50 that is carried by a police officer or is disposed in a patrol car in which a police officer rides, and in-car system 60 which is installed in the patrol car. Portable terminal 50 is a wireless communication device such as a smart phone, a portable telephone, a tablet terminal, or a personal digital assistant (PDA). In-car system 60 includes a camera, a recorder, a PC, a communication unit, and the like, thereby configuring an in-car camera system, a video image management system, and the like.

When a police officer is dispatched from a police station to carry out a predetermined duty (for example, patrols), the police officer is equipped with wearable camera 10, carries portable terminal 50 or disposes the same in a patrol car, and rides in the patrol car mounted with in-car system 60, thereby heading for the scene. In the front-end system, for example, video images of the scene at which the patrol car has arrived are captured by a camera of in-car system 60, and the police officer steps out of the patrol car. Then, more detailed video images of the scene are captured by wearable camera 10. Data of video images such as moving images and still images captured by wearable camera 10 are retained in a recorder such as a memory in portable terminal 50, or a recorder such as storage in a PC of in-car system 60, or are transmitted (uploaded) to the back-end system. Various pieces of data including the data of video images are transmitted to the back-end system from portable terminal 50 or in-car system 60. Transmission of data to the back-end system is carried out by being connected through wireless communication from the scene, or is carried out through wired communication or wireless communication, or in a manual manner (for example, through a hand-carried storage medium) when the police officer returns to the police station after completing the patrols.

The back-end system illustrated in FIG. 1 includes servers SV1 to SV3 which are installed in a police station or other places, and management software 70 for performing communication with the front-end system. Servers SV1 to SV3 are internally or externally provided with a storage such as a hard disk (HDD). In the back-end system, data of video images transmitted from the front-end system and other pieces of data are accumulated in servers SV1 to SV3. Servers SV1 to SV3 receive the data of video images transmitted from wearable camera 10 or in-car system 60, and retain the data in the storage such as the HDD. The data of video images accumulated in the back-end system is utilized by a person in charge in the relevant department of the police station, for example. As necessary, the data of video images is copied into a predetermined storage medium (for example, DVD: digital versatile disk) and is submitted to a predetermined scene (for example, trial) as evidence. In the present exemplary embodiment, the evidential video images of the scene can be acquired and retained in a more unerring manner by using wearable camera 10 which is equipped by a police officer. When using wearable camera 10, identification information (a user ID) of a user (a police officer), identification information (a camera ID) of the camera, and the like are set and registered so that it can be clearly discriminated with respect to the data of video images accumulated in the server when and which police officer using which camera that the video image is captured by.

Figure 2:
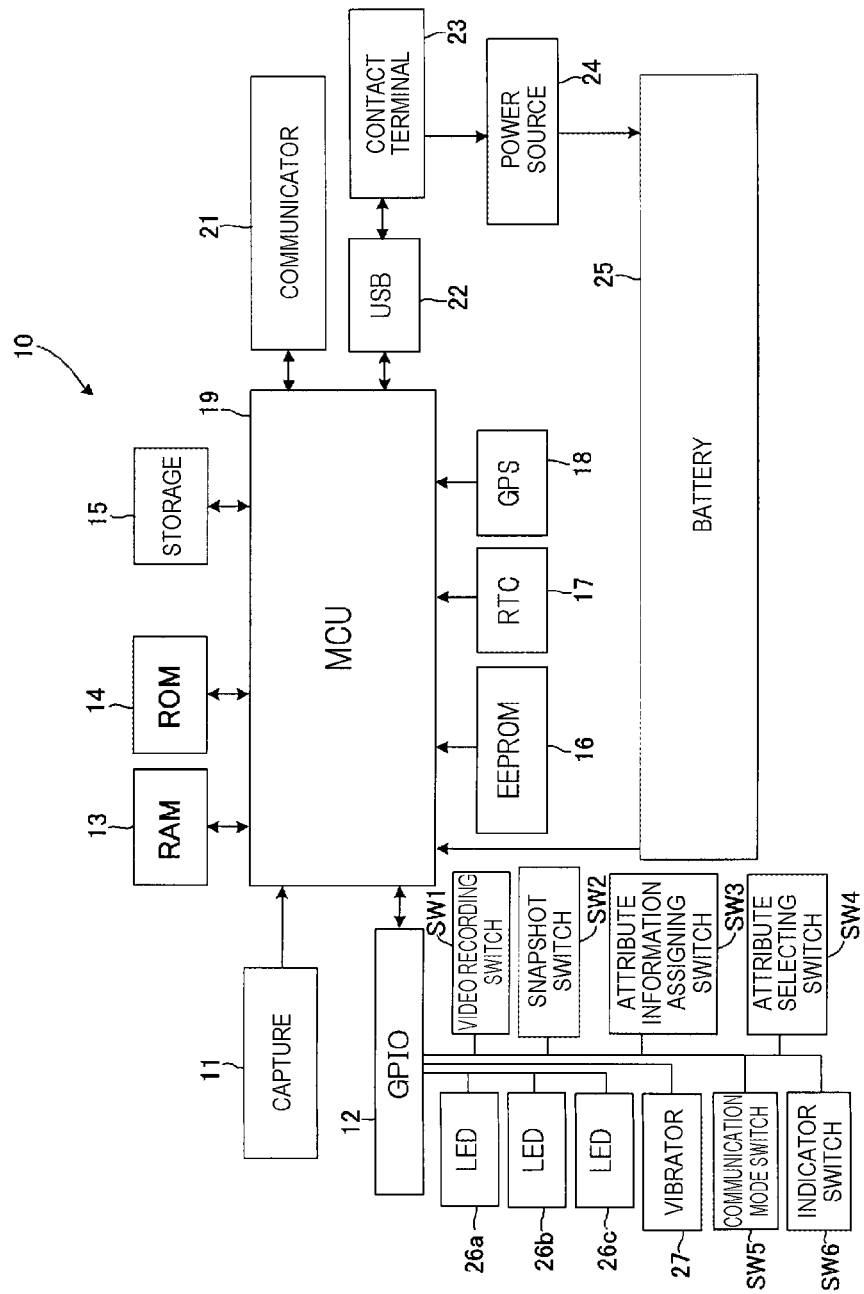
FIG. 2 is a block diagram illustrating an example of an internal configuration of the wearable camera, according to the exemplary example of the present invention.
Figure 3:
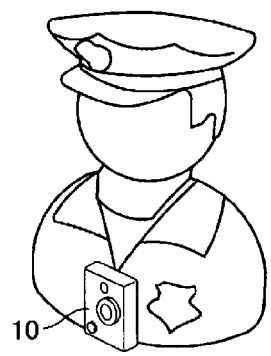
FIG. 3 is a diagram illustrating a state where a user is equipped with the wearable camera, according to the exemplary example of the present invention.
Figure 4:
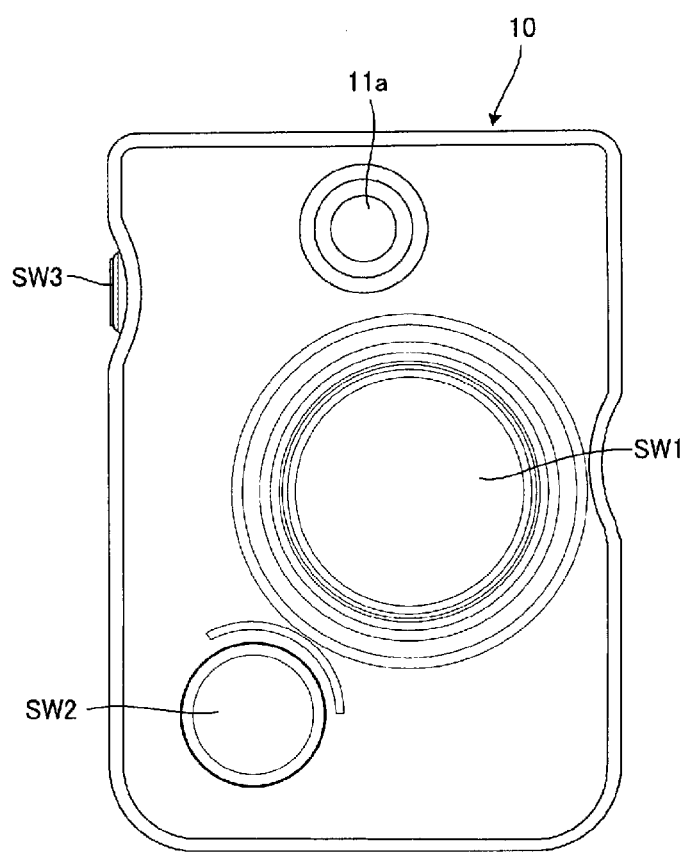
FIG. 4 is a front view illustrating an example of the appearance of the wearable camera, according to the exemplary example of the present invention.
Figure 5:
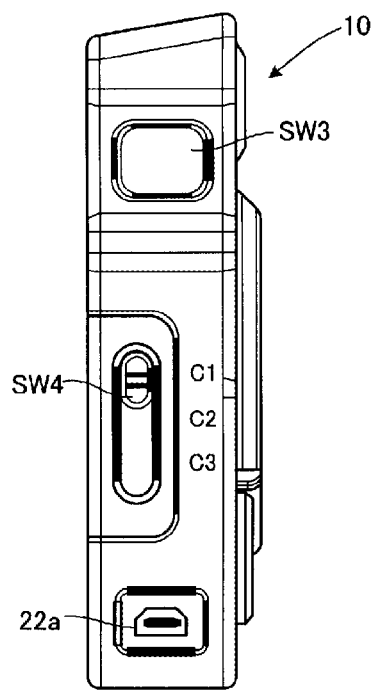
FIG. 5 is a left side view illustrating an example of the appearance of the wearable camera, according to the exemplary example of the present invention.
Figures 6, 7:
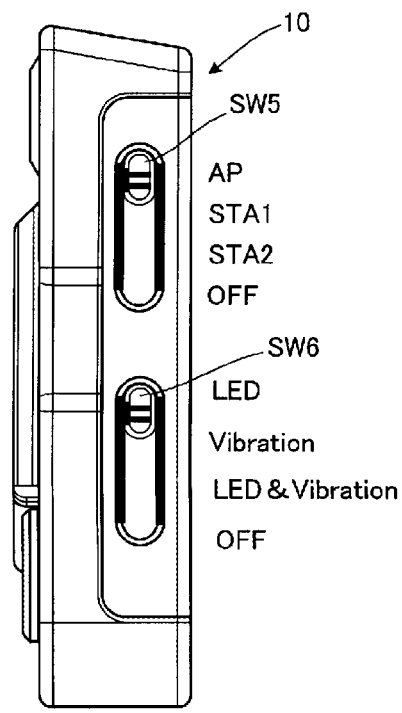
FIG. 6 is a right side view illustrating an example of the appearance of the wearable camera, according to the exemplary example of the present invention.
FIG. 7 is a diagram illustrating an example of setting attribute information, according to the exemplary example of the present invention.

FIG. 2 is a block diagram illustrating an example of an internal configuration of wearable camera 10, according to the present exemplary embodiment. FIG. 3 is a diagram illustrating a state where a user is equipped with wearable camera 10, according to the present exemplary embodiment. FIG. 4 is a front view illustrating an example of the appearance of wearable camera 10, according to the present exemplary embodiment. FIG. 5 is a left side view illustrating an example of the appearance of wearable camera 10, according to the present exemplary embodiment. FIG. 6 is a right side view illustrating an example of the appearance of wearable camera 10, according the present exemplary embodiment.

As illustrated in FIG. 2, wearable camera 10 includes capture 11, general purpose input/output (GPIO) 12, RAM 13, ROM 14, storage 15, electrically erasable programmable read-only memory (EEPROM) 16, real time clock (RTC) 17, global positioning system (GPS) 18, micro control unit (MCU) 19, communicator 21, universal serial bus (USB) 22, contact terminal 23, power source 24, and battery 25. As operation input sections, wearable camera 10 includes video recording switch SW1, snapshot switch SW2, attribute information assigning switch SW3, attribute selecting switch SW4, communication mode switch SW5, and indicator switch SW6. As state displays, wearable camera 10 is configured to include three light emitting diodes (LED) 26a, 26b, and 26c, and vibrator 27.

Capture 11 has an image capturing lens and a solid-state imaging device such as a charge coupled device-type (CCD) image sensor or a complementary metal oxide semiconductor-type (CMOS) image sensor, and outputs data of a video image of an imaging target obtained through image capturing to MCU 19. GPIO 12 is a parallel interface through which signals are input and output between video recording switch SW1, snapshot switch SW2, attribute information assigning switch SW3, attribute selecting switch SW4, communication mode switch SW5, indicator switch SW6, LEDs 26a to 26c, and vibrator 27; and MCU 19.

RAM 13 is a working memory which is used when operating MCU 19. ROM 14 is a memory in which programs and data for controlling MCU 19 are stored in advance. Storage 15 is configured to be a storage medium, for example, an SD memory, and stores data of video images obtained by being captured by capture 11. When the SD memory is applied as storage 15, the memory can be attached to and detached from the casing main body of wearable camera 10.

EEPROM 16 stores identification information (serial numbers) which identifies wearable camera 10, and other pieces of setting information. RTC 17 counts current time information and outputs the information to MCU 19. GPS 18 receives current positional information of wearable camera 10 from a GPS transmitter and outputs the information to MCU 19.

MCU 19 functions as a controller, thereby performing controlling processing to collectively generalize operations of each unit in wearable camera 10, inputting and outputting processing of data with respect to each of other units, computation (calculation) processing of data, and storing processing of data. MCU 19 operates in accordance with the program and data stored in ROM 14. MCU 19 uses RAM 13 during an operation, acquires current time information from RTC 17, and acquires current positional information from GPS 18.

For example, communicator 21 defines the connection between communicator 21 and MCU 19 in a physical layer which is a first layer in an open systems interconnection (OSI) reference model and performs wireless communication (for example, Wi-Fi (registered trademark)) through a wireless LAN (W-LAN), for example, in accordance with the definition thereof. A communicator which performs wireless communication such as Bluetooth (registered trademark) may be applied as communicator 21. USB 22 is a serial bus which allows wearable camera 10 to be connected to in-car system 60, a PC in a police station, and the like.

Contact terminal 23 is a terminal to be electrically connected with a cradle, an external adaptor, and the like. Contact terminal 23 is connected to MCU 19 via USB 22, and is connected to power source 24. Wearable camera 10 can be charged and communication of data including data of video images can be performed via contact terminal 23. For example, contact terminal 23 is provided with "charge terminal V+", "CON.DET terminal", "data terminals D− and D+", and "a ground terminal". CON.DET terminal is a terminal for detecting voltage variation. Data terminals D− and D+ are terminals for transmitting data of video images captured by wearable camera 10 to an external PC or the like, for example, via a USB connector terminal. As contact terminal 23 is connected to a cradle or a connector of an external adaptor, data communication can be performed between wearable camera 10 and an external apparatus.

Power source 24 supplies electricity for power supplied from a cradle or an external adaptor via contact terminal 23, to battery 25, thereby charging battery 25. Battery 25 is configured to be a rechargeable secondary battery and supplied electricity for power to each of the units in wearable camera 10.

Video recording switch SW1 is a push button switch for inputting an operational instruction to perform start/stop of video recording (capturing of a moving image) through a pressing operation of a user. Snapshot switch SW2 is a push button switch for inputting an operational instruction to perform image capturing of a still image through a pressing operation of a user. Attribute information assigning switch SW3 is a push button switch for inputting an operational instruction to assign attribute information to data of a video image performed through a pressing operation of a user. Attribute selecting switch SW4 is a slide switch for inputting an operational instruction to select an attribute to be assigned to data of a video image. Communication mode switch SW5 is a slide switch for inputting an operational instruction to set a communication mode between wearable camera 10 and an external apparatus. Indicator switch SW6 is a slide switch for inputting an operational instruction to set an operational state display mode for LEDs 26a to 26c and vibrator 27. Video recording switch SW1, snapshot switch SW2, attribute information assigning switch SW3, and attribute selecting switch SW4 are configured to be able to be easily operated even in an emergency situation. Each of switches SW1 to SW6 is not limited to the above-described embodiments. The switch may be an operational input device in a different embodiment allowing a user to input an operational instruction.

LED 26a is a display indicating a power-supply state (ON-OFF state) of wearable camera 10 and a state of battery 25. LED 26b is a display indicating a state of the image capturing operation (video recording state) of wearable camera 10. LED 26c is a display indicating a state of the communication mode of wearable camera 10.

MCU 19 detects inputs and outputs of each of the switches such as video recording switch SW1, snapshot switch SW2, attribute information assigning switch SW3, attribute selecting switch SW4, communication mode switch SW5, and indicator switch SW6, and performs processing with respect to an input of the operated switch. When an operational input of video recording switch SW1 is detected, MCU 19 controls a start or a stop of the image capturing operation in capture 11, and retains the captured data obtained from capture 11 in storage 15 as image data of a moving image. When an operational input of snapshot switch SW2 is detected, MCU 19 retains the captured data obtained by capture 11 when snapshot switch SW2 is operated in storage 15 as image data of a still image.

When an operational input of attribute information assigning switch SW3 is detected, MCU 19 assigns attribute information which has been set in advance to the data of a video image, and retains the information in storage 15 by associating the information with the data of a video image. In this case, association information indicating an associated relationship between the state of attribute selecting switch SW4 and predetermined attribute information is held by EEPROM 16, and MCU 19 detects the state of attribute selecting switch SW4, thereby assigning attribute information corresponding to the setting for attribute selecting switch SW4. MCU 19 detects the state of communication mode switch SW5 and operates communicator 21 in accordance with a communication mode corresponding to the setting for communication mode switch SW5. When a video recording operation starts, MCU 19 detects the state of indicator switch SW6 and notifies the outside of the state of the video recording operation through the LED display and/or vibrations of the vibrator, in accordance with the setting of indicator switch SW6.

As illustrated in FIG. 3, wearable camera 10 is used in an equipped state on worn clothes or the body of a user, for example, the chest of a police officer who is a user so as to capture a video image in a viewing field from a position close to the viewpoint of the user. The user captures an imaging target on the periphery by operating video recording switch SW1 in a state of being equipped with wearable camera 10.

As illustrated in FIG. 4, in wearable camera 10, image capturing lens 11a of capture 11, video recording switch SW1, and snapshot switch SW2 are provided on the frontal face of the casing having a substantially rectangular parallelepiped shape. For example, video recording (capturing of a moving image) starts by pressing video recording switch SW1 an odd number of times, and the video recording ends by pressing the switch an even number of times. Every time Snapshot switch SW2 is pressed, capturing of a still image at that moment is executed.

As illustrated in FIG. 5, attribute information assigning switch SW3, attribute selecting switch SW4, and USB connector 22a are provided on the left side of the casing of wearable camera 10 when viewed in front thereof. As a user performs a pressing operation with attribute information assigning switch SW3, attribute information corresponding to the setting state of attribute selecting switch SW4 is assigned to data of a video image which is currently video-recorded or data of a video image which is video-recorded immediately before. In the illustrated example, attribute selecting switch SW4 is a slide switch having contact point positions of three stages C1, C2, and C3. A user selects and designates attribute information which has been allocated and set to each of stages C1 to C3. A cable for being connected to an external apparatus through the USB is connected to USB connector 22a, thereby allowing wearable camera 10 to be connected to in-car system 60 and a PC or the like in a police station so as to transmit and receive data.

As illustrated in FIG. 6, communication mode switch SW5 and indicator switch SW6 are provided on the right side of the casing of wearable camera 10 when viewed in front thereof. In the illustrated example, communication mode switch SW5 is a slide switch having contact point positions of four stages AP, STA1, STA2, and OFF. A user selects and designates a communication mode of wearable camera 10. Stage AP is an access point mode. In this mode, wearable camera 10 operates as an access point for the wireless LAN and is connected to portable terminal 50 wirelessly so that communication is performed between wearable camera 10 and portable terminal 50. In the access point mode, portable terminal 50 is connected to wearable camera 10, thereby allowing displaying of a current live video image obtained by wearable camera 10, reproducing of data of a video-recorded image, assigning of attribute information, displaying of a captured still image, and the like. STA1 and STA2 are station modes. In these modes, communication is performed while having an external apparatus as an access point when being connected to the external apparatus through the wireless LAN. STA1 is a mode to be connected to an access point in a police station, and STA2 is a mode to be connected to in-car system 60. In the station mode, wearable camera 10 can be set, and data of a video-recorded image can be transmitted (uploaded) to wearable camera 10. OFF is a mode to turn off a communication operation through the wireless LAN. In this mode, the wireless LAN is not in use.

In the illustrated example, indicator switch SW6 is a slide switch having contact point positions of four stages of LED, Vibration, LED & Vibration, and OFF. A user selects and designates the notification mode of wearable camera 10. LED is a mode for displaying an operational state of wearable camera 10 in video-recording, for example, through LEDs 26a to 26c. Vibration is a mode for issuing notification of an operational state of wearable camera 10 through vibration of vibrator 27. LED & Vibration is a mode for issuing notification of an operational state of wearable camera 10 through the displaying of LEDs 26a to 26c and vibration of vibrator 27. OFF is a mode for turning off the notification operation of an operational state.

LEDs 26a to 26c are disposed on the top face when viewed in front of the casing of wearable camera 10. Accordingly, the LEDs can be easily and visually recognized by a user in a state of being equipped with wearable camera 10, and no one else can see the LEDs except the user oneself. Contact terminal 23 is provided on the bottom face of the casing of wearable camera 10 when viewed in front thereof.

Subsequently, descriptions will be given regarding assigning of attribute information to data of a video image, according to the present exemplary embodiment, on an assumption of a case where video recording is performed by wearable camera 10, and data of video images transmitted to servers SV1 to SV3 and accumulated is utilized in the wearable camera system. In this case, an object data of a video image is extracted from the pieces of accumulated data of video images based on some sort of attribute information related to the data of video images such as the type of the contents of the video image, the user who captured the image, the date and time, and the location, thereby being reproduced. When no attribute information exists in the data of a video image, it is difficult to distinguish the captured video images from one another so that the target data of a video image cannot be extracted. Therefore, when many pieces of data of video images are accumulated, there is a need to assign the attribute information. Here, it is assumed that classification information (Classify) indicating the type of the contents of a video image is assigned as the attribute information, and the pieces of data of video images can be individually sorted by the type. Assigning of the attribute information with respect to the data of a video image is also referred to as tagging or the like. The attribute information is not limited to the classification information, and includes all types of information regarding the data of a video-recorded image. The classification information, which is the attribute information, may be arranged in hierarchical structure, or may be categorized in multiple systems differently classified.

When a user leaves the scene where an image has captured by using wearable camera 10 and assigns attribute information by using a PC or the like in a police station afterwards, since the user determines the type of the data of video images by reproducing thereof and assigns the attribute information, time and labor are required. As the pieces of data of video images assigned with no attribute information are piled up, it becomes troublesome to individually check the data of video images, and thus, much labor is required to determine the type and to assign the attribute information. Therefore, the present exemplary embodiment provides a configuration example of wearable camera 10 in which the attribute information can be easily assigned immediately after video recording or during video recording.

FIG. 7 is a diagram illustrating an example of setting the attribute information regarding attribute selecting switch SW4. When wearable camera 10 is in use, as illustrated in FIG. 7, the attribute information is set and allocated in association with each of states (the contact point positions) C1 to C3 of attribute selecting switch SW4. The illustrated example is given on an assumption of a case where a police officer, who is a user, captures circumstantial images of the scene of an incident. C1 is allocated to traffic accident, C2 is allocated to drunken driving, and C3 is allocated to speeding respectively. The allocation of the attribute information is set by selecting the attribute information which is most frequently used by a user, among the pieces of the attribute information in multiple definitions. The contents of the set attribute information are stored in EEPROM 16 of wearable camera 10 as one piece of the setting information.

Figure 8:
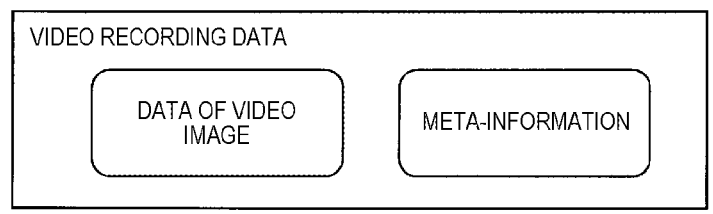
FIG. 8 is a diagram illustrating an example of data structure of video recording data, according to the exemplary example of the present invention.

FIG. 8 is a diagram illustrating an example of data structure of video recording data. FIG. 9 is a diagram illustrating an example of data structure of a video-recorded image list. In wearable camera 10 according to the present exemplary embodiment, when performing video recording, as illustrated in FIG. 8, together with data of a captured video image, meta-information including the attribute information which is associated with the data of a video image is generated, and both the pieces of data are stored in storage 15 as video recording data in which both the pieces of data are associated with each other. In other words, the video recording data stored in storage 15 includes the data of a video image and the meta-information. When transmitting the data of a video image from wearable camera 10 to servers SV1 to SV3, the video recording data including the data of a video image and the meta-information is transmitted and accumulated.

The meta-information in association with the data of a video image is stored in a form of the video-recorded image list as illustrated in FIG. 9. The meta-information of the video-recorded image list includes an event ID, time information, a camera ID, a user ID, attribute information, GPS information, and the like. The event ID is identification information for identifying the event of video recording. In the present exemplary embodiment, one session of a video recording operation from the start of video recording until the end of video recording is defined as one event, and an event ID is assigned to each event (hereinafter, also referred to as the video recording event) of video recording operation. As the event ID, the file name or the like of the data of a video image may be applied. The time information is time information of each video recording event, and the start time of video recording is assigned, for example. As the time information, in addition to applying of only the start time of video recording, the start time of video recording and the end time of video recording, the start time of video recording and the duration time of video recording, and the like may be applied.

The camera ID is identification information for individually identifying wearable camera 10. A user ID is identification information of a police officer who is a user using wearable camera 10. When wearable camera 10 is in use, the camera ID and the user ID are set so that it can be distinguished with respect to the data of a video-recorded image which one of the cameras used for video recording by whom.

The attribute information is the classification information for identifying the type of the data of a video image and is assigned in accordance with attribute information assigning switch SW3 and attribute selecting switch SW4 operated by a user based on the contents of the set attribute information illustrated in FIG. 7. GPS information is positional information indicating the location where video recording of the data of a video image is performed. For example, current positional information at the time of a start of video recording is acquired from GPS 18, thereby being assigned. Each piece of the above-described meta-information is assigned through the processing of MCU 19 at the time of the start of video recording or immediately after the end of video recording, thereby being stored in storage 15 by being associated with the data of a video image.

Subsequently, descriptions will be given in more detail regarding an assigning operation of the attribute information, according to the first exemplary example.

Figure 10:
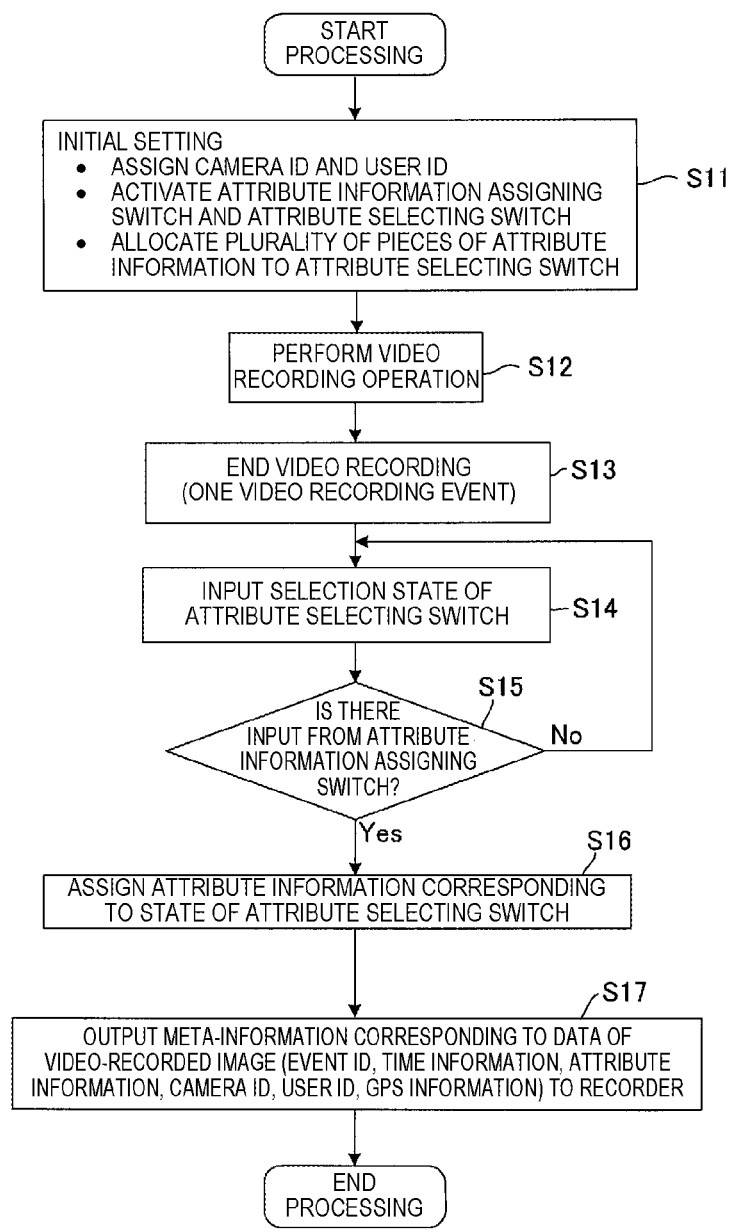
FIG. 10 is a flow chart illustrating an example of a procedure regarding an attribute information assigning operation of the wearable camera, according to the first exemplary example of the present invention.

FIG. 10 is a flow chart illustrating an example of a procedure regarding an attribute information assigning operation of wearable camera 10, according to the present exemplary embodiment.

MCU 19 of wearable camera 10 executes initial setting prior to the video recording (Step S11). The initial setting of wearable camera 10 is performed at the time of dispatch of a police officer, who is a user, by having access to a PC in a police station, operating the PC, and transmitting setting information. For example, as the initial setting, for example, assigning of a camera ID and a user ID (refer to FIG. 9), activating of attribute information assigning switch SW3 and attribute selecting switch SW4, and allocating of the plurality of pieces of attribute information to attribute selecting switch SW4 (refer to FIG. 7) are executed.

When an input of video recording switch SW1 is detected, MCU 19 starts performing video recording, executes image capturing by capture 11, and stores the video image data of a moving image in storage 15 (Step S12).

When a second input of video recording switch SW1 is detected, MCU 19 thereby ends the video recording of one video recording event (Step S13). Subsequently, MCU 19 inputs the selection state of attribute selecting switch SW4 (Step S14) and determines whether or not an input of attribute information assigning switch SW3 is present (Step S15).

When there is an input from attribute information assigning switch SW3, MCU 19 reads the attribute information corresponding to the state of attribute selecting switch SW4 from EEPROM 16, thereby assigning the information to the data of a video image (Step S16). MCU 19 outputs the meta-information including the assigned attribute information to storage 15, and then, the meta-information is stored therein by being associated with the data of a video image which has ended the video recording operation and has stored immediately before (Step S17). The meta-information includes the event ID, the time information, the attribute information, the camera ID, a user ID, and GPS information (refer to FIG. 9). MCU 19 thereby ends the attribute information assigning processing.

The aforementioned example has described a procedure in which the attribute information is assigned after one video recording event ends. However, the procedure in which an input of attribute information assigning switch SW3 is detected while the video recording continues and the attribute information is assigned during video recording may be adopted.

In the aforementioned example, the attribute information corresponding to the state of attribute selecting switch SW4 is assigned among the pieces of the attribute information allocated to attribute selecting switch SW4. However, for example, it is possible to assign the attribute information corresponding to voice from a user by using a voice recognition function. In this case, without being limited by the number of physical contact points of the attribute selecting switch, any type of the attribute information can be assigned.

In this manner, in the present exemplary embodiment, when image capturing is performed by using wearable camera 10, it is possible to easily assign the attribute information with respect to the data of a video image by operating the simplex body of wearable camera 10 immediately after being video-recorded or during video recording. Therefore, it is possible to reliably set the attribute information of the data of a video image even at the scene of image capturing in an emergency situation. When utilizing the data of a video image accumulated in the server, it is possible to easily distinguish and extract the type of the data of a video image by referring to the attribute information. On account of the meta-information including the attribute information, it is possible to easily identify the data regarding when, where, by using which camera, captured by whom, the type of contents in the video image, the data has captured. Therefore, it is possible to enhance the reliability thereof as an evidential video image.

According to the present exemplary embodiment, since the attribute of the data of a video image can be easily set by wearable camera 10, it is possible to reduce time and labor when assigning the attribute information and is also possible to simply execute the identification of the data of a video image from immediately after the video recording. Accordingly, it is possible to improve convenience when handling the data of a captured video image in the wearable camera system.

As described above, wearable camera 10 according to the present exemplary embodiment has capture 11, storage 15 which stores the data of a video image captured by capture 11, and the operation input section for inputting an operation performed by a user. The operation input section includes attribute information assigning switch SW3 for inputting an assigning operation of the attribute information which is associated with the data of a video image, and attribute selecting switch SW4 for inputting a selection operation of the attribute information. The operation input section is also provided with MCU 19 which assigns the attribute information corresponding to the setting state of attribute selecting switch SW4 to the data of a video image and stores the data in storage 15 when there is an input from attribute information assigning switch SW3.

In this manner, as the attribute information selected by attribute selecting switch SW4 is assigned to the data of a video image captured by capture 11 based on the operational input of attribute information assigning switch SW3, it is possible to easily assign the attribute information to the data of a video-recorded image in wearable camera 10. Accordingly, it is possible to reduce time and labor when assigning the attribute information and is also possible to simply execute the identification of the data of a video image from immediately after the video recording. Therefore, it is possible to improve convenience when handling the data of a captured video image in the wearable camera system.

In wearable camera 10 according to the present exemplary embodiment, the pieces of the attribute information different from one another with respect to each of the plurality of the setting states can be allocated and set in attribute selecting switch SW4. Accordingly, it is possible to selectively set the desired attribute information from the plurality of pieces of attribute information by operating attribute selecting switch SW4 and is possible to assign suitable attribute to the data of a video image.

In wearable camera 10 according to the present exemplary embodiment, MCU 19 detects an input from attribute information assigning switch SW3 during a session from an end of a video recording operation of the video image data performed by capture 11 till a start of a next video recording operation, or during a video recording operation of the video image data performed by capture 11, thereby assigning the attribute information to the video recording data which has video-recorded immediately before, or to the video recording data which is currently video-recorded.

Accordingly, it is possible to easily assign the attribute information with respect to the data of a video image by operating the simplex body of wearable camera 10 immediately after being video-recorded or during video recording.

Subsequently, a second exemplary example according to the present invention will be described. Basically, the wearable camera according to the second exemplary example also has the same configuration as the wearable camera according to the first exemplary example. Therefore, descriptions will be referred to FIGS. 1 to 8 as necessary.

FIG. 11 is a diagram illustrating an example of the data structure of the video-recorded image list, according to the second exemplary example. In wearable camera 10, when performing video recording, as illustrated in FIG. 8, together with data of a captured video image, meta-information including the attribute information which is associated with the data of a video image is generated, and both the pieces of data are stored in storage 15 as video recording data in which both the pieces of data are associated with each other. In other words, the video recording data stored in storage 15 includes the data of a video image and the meta-information. When transmitting the data of a video image from wearable camera 10 to servers SV1 to SV3, the video recording data including the data of a video image and the meta-information is transmitted and accumulated.

The meta-information in association with the data of a video image is stored in a form of the video-recorded image list as illustrated in FIG. 11. The meta-information of the video-recorded image list includes an event ID, time information, a camera ID, a user ID, attribute information, GPS information, and the like. The event ID is identification information for identifying the event of video recording. In the present exemplary embodiment, one session of a video recording operation from the start of video recording until the end of video recording is defined as one event, and an event ID is assigned to each event (hereinafter, also referred to as the video recording event) of video recording operation. As the event ID, the file name or the like of the data of a video image may be applied. The time information is time information of each video recording event, and the start time of video recording is assigned, for example. As the time information, in addition to applying of only the start time of video recording, the start time of video recording and the end time of video recording, the start time of video recording and the duration time of video recording, and the like may be applied.

The camera ID is identification information for individually identifying wearable camera 10. A user ID is identification information of a police officer who is a user using wearable camera 10. When wearable camera 10 is in use, the camera ID and the user ID are set so that it can be distinguished with respect to the data of a video-recorded image which one of the cameras used for video recording by whom.

The attribute information is the classification information for identifying the type of the data of a video image and is assigned in accordance with attribute information assigning switch SW3 and attribute selecting switch SW4 operated by a user based on the contents of the set attribute information illustrated in FIG. 7. In the present exemplary embodiment, the plurality of pieces of the attribute information can be assigned to one video recording event (the same event ID). GPS information is positional information indicating the location where video recording of the data of a video image is performed. For example, current positional information at the time of a start of video recording is acquired from GPS 18, thereby being assigned. Each piece of the above-described meta-information is assigned through the processing of MCU 19 at the time of the start of video recording or immediately after the end of video recording, thereby being stored in storage 15 by being associated with the data of a video image.

Next, the assigning operation of attribute information in a second exemplary example will be described in more detail.

Figure 12:
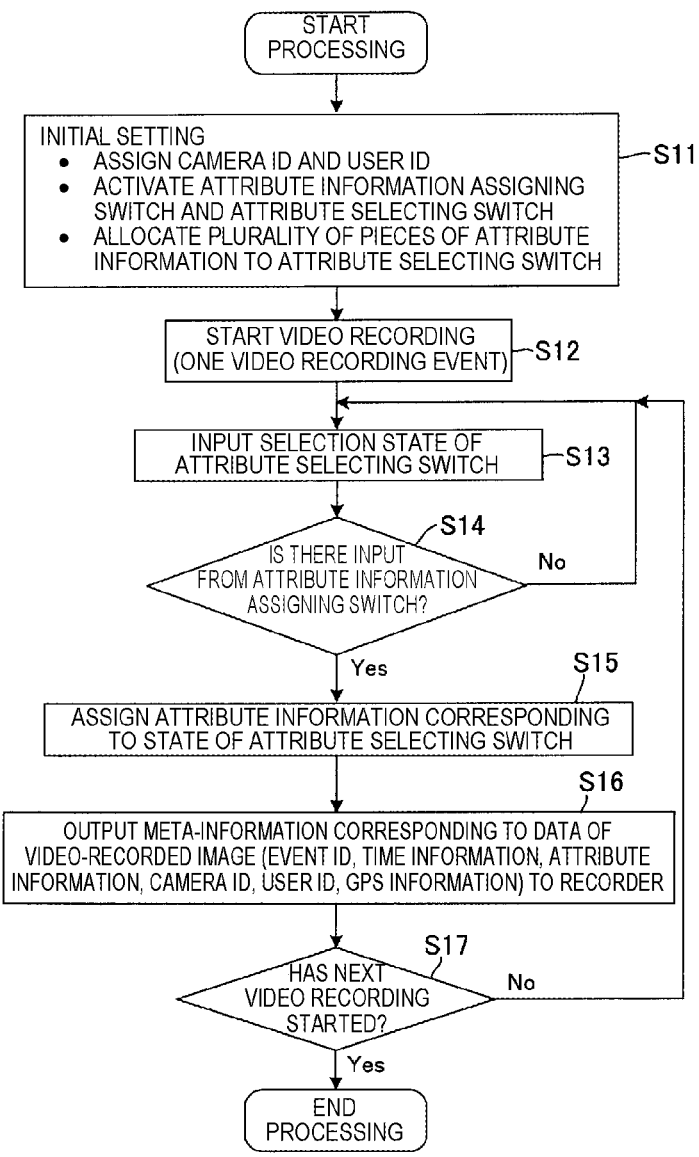
FIG. 12 is a flow chart illustrating an example of a procedure regarding the attribute information assigning operation of the wearable camera, according to the second exemplary example of the present invention.

FIG. 12 is a flow chart illustrating an example of a procedure regarding the attribute information assigning operation of wearable camera 10 of the present exemplary embodiment.

MCU 19 in wearable camera 10 performs initial setting before the video recording operation (Step S11). The initial setting of wearable camera 10 is carried out by, for example, when a police officer who is a user is dispatched, connecting to a PC in a police station and operating the PC so as to transmit setting information. As the initial setting, assigning of a camera ID and a user ID (refer to FIG. 9), activation of attribute information assigning switch SW3 and attribute selecting switch SW4, and allocation a plurality of pieces of attribute information to attribute selecting switch SW4 (refer to FIG. 7) are carried out.

When an input of video recording switch SW1 is detected, MCU 19 starts a video recording operation and performs capturing using capture 11, thereby storing data of a video image of a moving image in storage 15 (Step S12).

In addition, MCU 19 inputs a selecting state of attribute selecting switch SW4 (Step S13) and determines the presence or absence of an input of attribute information assigning switch SW3 (Step S14).

When there is an input from attribute information assigning switch SW3, MCU 19 reads attribute information corresponding to the state of attribute selecting switch SW4 from EEPROM 16 and assigns to the data of a video image (Step S15). In addition, MCU 19 outputs meta-information including the assigned attribute information to storage 15, associates the meta-information with data of a video image which is currently video-recorded, and stores the meta-information (Step S16). The meta-information includes an event ID, time information, attribute information, a camera ID, a user ID, and GPS information (refer to FIG. 11).

Next, MCU 19 determines whether or not one event of video recording ends and then an operation of next video recording starts (Step S17). Until a start of an event of next video recording, assigning of other attribute information is allowed. When a next operation of video recording is not started, MCU 19 returns to processing of Steps S13 and S14, performs processing of Step S15 and S16 in accordance with a user's instruction of assigning attribute information, that is, when there is an input of attribute information assigning switch SW3, assigns attribute information corresponding to the state of attribute selecting switch SW4, associates the attribute information with data of a video image which is currently video-recorded, and stores the attribute information.

Here, when a second input of video recording switch SW1 is detected, MCU 19 ends the video recording operation for one event of video recording. As described above, when a next video recording operation is not started even after the video recording operation for one event of video recording is ended, processing of Step S13 to S16 is carried out. In this case, attribute information corresponding to the state of attribute selecting switch SW4 is assigned in accordance with an input of attribute information assigning switch SW3, is associated with the data of video recording stored immediately before after the end of the video recording operation, and is stored.

In the determination of Step S17, when a next video recording operation is started, MCU 19 ends assigning processing of attribute information.

Meanwhile, in the above-described example, among attribute information allocated to attribute selecting switch SW4 in advance, attribute information corresponding to the state of attribute selecting switch SW4 is assigned; however, for example, it is also possible to assign attribute information corresponding to a user's voice using a voice recognition function. In this case, it becomes possible to assign any attribute information without any limitation in the number of physical contact points of the attribute selecting switch.

FIG. 13 is a diagram illustrating a time chart showing an example of the attribute information assigning operation in the present exemplary embodiment. The illustrated example illustrates an example of an operation in which two pieces of attribute information are assigned from the start to end of one event of video recording, and one piece of attribute information is assigned after the end of the event of video recording until the start of a next event of video recording.

In wearable camera 10, when video recording of data of a video image starts and attribute information assigning switch SW3 is operated at the time of t1, attribute information A corresponding to the state of attribute selecting switch SW4 at this time is assigned to the date of a video image which is currently video-recorded. After that, when the state of attribute selecting switch SW4 is switched and attribute information assigning switch SW3 is operated by a user at the time of t2, attribute information B corresponding to the state of attribute selecting switch SW4 at this time is assigned to the date of a video image which is currently video-recorded. In addition, when the state of attribute selecting switch SW4 is switched and attribute information assigning switch SW3 is operated by a user after the end of video recording of data of a video image before the start of next video recording, attribute information C corresponding to the state of attribute selecting switch SW4 at this time is assigned to the date of a video image which is video-recorded immediately before. The attribute information C at this time is assigned as attribute information at the time of starting video recording to. In the video-recorded image list shown in FIG. 9, time information corresponds to a time at which attribute information is assigned. That is, it is possible to assign a plurality of pieces of attribute information which differ depending on the elapsed time (video image position) together with time information in one data of a video image.

For example, when a police officer is dispatched to a scene of an incident and records a video using wearable camera 10, there are cases in which the status of the scene is changed during the recording of a video and assigning of different pieces of attribute information is required. The example of the video-recorded image list shown in FIG. 9 shows an example in which, in a case where a police officer starts video recording in a scene of over-speed driving, assigns attribute information of over-speed driving, and then finds out that the driver has done driving while intoxicated, the police officer additionally assigns attribute information of driving while intoxicated. As described above, when one date of a video image of one event of video recording includes multiple scenes including different video recording contents, for example, includes several incident elements, many pieces of attribute information differing depending on scenes can be assigned.

As described above, in the second exemplary example, when an image is recorded using wearable camera 10, it is possible to easily assign a plurality of pieces of attribute information regarding data of a video image while or immediately after the video is recorded by an operation of wearable camera 10 alone. Therefore, even in an imaging spot in case of urgency, it is possible to reliably set a transmission destination on the basis of the attribute information of the video image data. In addition, when data of a video image accumulated in a server is used, it is possible to easily determine to which type of data of a video image the captured image belongs and extract the data by referring to attribute information. In addition, it is possible to easily identify when, where, with which camera, and by whom the image has been recorded and what content the image includes using meta-information including attribute information and increase the reliability of the image as an evidence. In addition, it is possible to accurately and appropriately determine and extract the type of data of a video image by assigning a plurality of pieces of attribute information.

According to the second exemplary example, since multiple attributes can be easily set for data of a video image using wearable camera 10, it is possible to save efforts for assigning attribute information and conveniently identify data of a video image. Therefore, it is possible to improve convenience when data of a captured video image is handled.

As described above, when attribute information is respectively assigned to multiple times of inputs from attribute information assigning switch SW3, it is possible to easily assign a plurality of pieces of attribute information to one data of a video image while or immediately after data of a video image is recorded using wearable camera 10. Then, it is possible to save efforts for assigning attribute information and conveniently identify data of a video image immediately after recording of an image, and thus convenience for handling data of a captured video image can be improved in wearable camera system.

In addition, in wearable camera 10, it is possible to individually set different pieces of attribute information to multiple setting states of attribute selecting switch SW4 by allocating the different pieces of attribute information. Then, it is possible to selectively set desired attribute information from a plurality of pieces of attribute information by an operation of attribute selecting switch SW4 and assign an appropriate attribute to data of a video image.

In addition, it is possible to easily assign a plurality of pieces of attribute information to data of a video image by an operation of wearable camera 10 alone immediately after or while the image is recorded. For example, when one date of a video image of one event of video recording includes multiple scenes including different video recording contents, it is possible to assign many pieces of attribute information differing depending on scenes together with pieces of time information for individual scenes.

Hereinafter, various embodiments have been described with reference to the accompanying drawings, but it is needless to say that the present invention is not limited to the examples. It is evident that a person skilled in the art is conceivable of various transformation examples or modification examples within the scope of the claims, and it is understood that those examples belong to the technical scope of the present invention. In addition, within the scope of the gist of the present invention, individual components may be arbitrarily combined to the embodiments.

Next, a third exemplary example will be described. The third exemplary example will be described with reference to FIGS. 1 to 8 as necessary. FIG. 14 is a diagram illustrating an example of setting of a transmission destination of the data of a video image in accordance with the attribute information. In the present embodiment, attribute information of the date of a video image and the data transmission destination are tied together, and, during data transmission, the date of a video image is distributed and accumulated in multiple servers depending on attribute information. When data of a video image captured using wearable camera 10 is transmitted, as illustrated in FIG. 8, servers of transmission destinations differing depending on attribute information are set. In the illustrated example, a car accident, a driving while intoxicated, and over-speed driving are respectively distributed to Server-1, Server-2, and Server-3. For example, Server-1 corresponds to server SV1, Server-2 corresponds to server SV2, and Server-3 corresponds to server SV3. Priorities differ depending on the types of data of captured video images (herein, the types of incidents), and there are cases in which preservation periods differ to be two years, ten years, and the like depending on the regulation of the evidence preservation periods and the like. Therefore, a server of transmission destination is set on the basis of attribute information so that attribute information can be accumulated in an appropriate server. Meanwhile, depending on attribute information, a case can be considered in which data of a video image with multiple attributes is transmitted to the same server; however, herein, different transmission destinations are set for individual attribute information.

FIG. 15 is a diagram illustrating an example of data structure of the video recording data and FIG. 16 is a diagram illustrating an example of data structure of the video-recorded image list. In wearable camera 10 of the present embodiment, when a video is recorded, as shown in FIG. 15, meta-information including attribute information associated with video recording data is generated together with captured video recording data, and video recording data obtained by associating both data is stored in storage 15. That is, video recording data stored in storage 15 include video image data and meta-information. When video image data is transmitted to servers SV1 to SV3 from wearable camera 10, video recording data including video image data and meta-information is transmitted and accumulated.

Meta-information associated with video recording data is stored in a form of a video-recorded image list shown in FIG. 16. Meta-information in the video-recorded image list includes an event ID, time information, a camera ID, a user ID, priority, attribute information, GPS information, and the like. The event ID is identification information for identifying an event of video recording. In the present embodiment, one operation for video recording from the start to end of video recording is regulated as one event, and one event ID is assigned to an event of individual video recording operation (hereinafter, also referred to as video recording event). As the event ID, the file name of video recording data may be used. The time information is time information of individual video recording event, and, for example, recording start time is assigned. As the time information, in addition to recording start time, recording start time and recording end time, and recording start time and recording stop time, and the like may be used.

The camera ID is identification information for identifying individual wearable cameras 10. The user ID is identification information of a police officer who is a user using wearable camera 10. When wearable camera 10 is used, the camera ID and the user ID are set for video-recorded video recording data so that who has recorded the image using which camera can be determined.

The attribute information is classification information for identifying the class of video image data, and is assigned in accordance with the operations of attribute information assigning switch SW3 and attribute selecting switch SW4 by a user, on the basis of the setting contents of the attribute information shown in FIG. 7. The priority is priority information which is set by the attribute information on the basis of the setting contents of the attribute information shown in FIG. 7. The GPS information is location information indicating a place in which video image data is recorded, and is assigned by acquiring, for example, current location information during the start of video recording from GPS 18. The each piece of the meta-information is assigned by the process of MCU 19 immediately after the start of video recording or the termination of video recording, and is stored in storage 15 in association with the video image data.

Next, the attribute information assigning operation in the third example will be described in more detail.

Figure 17:
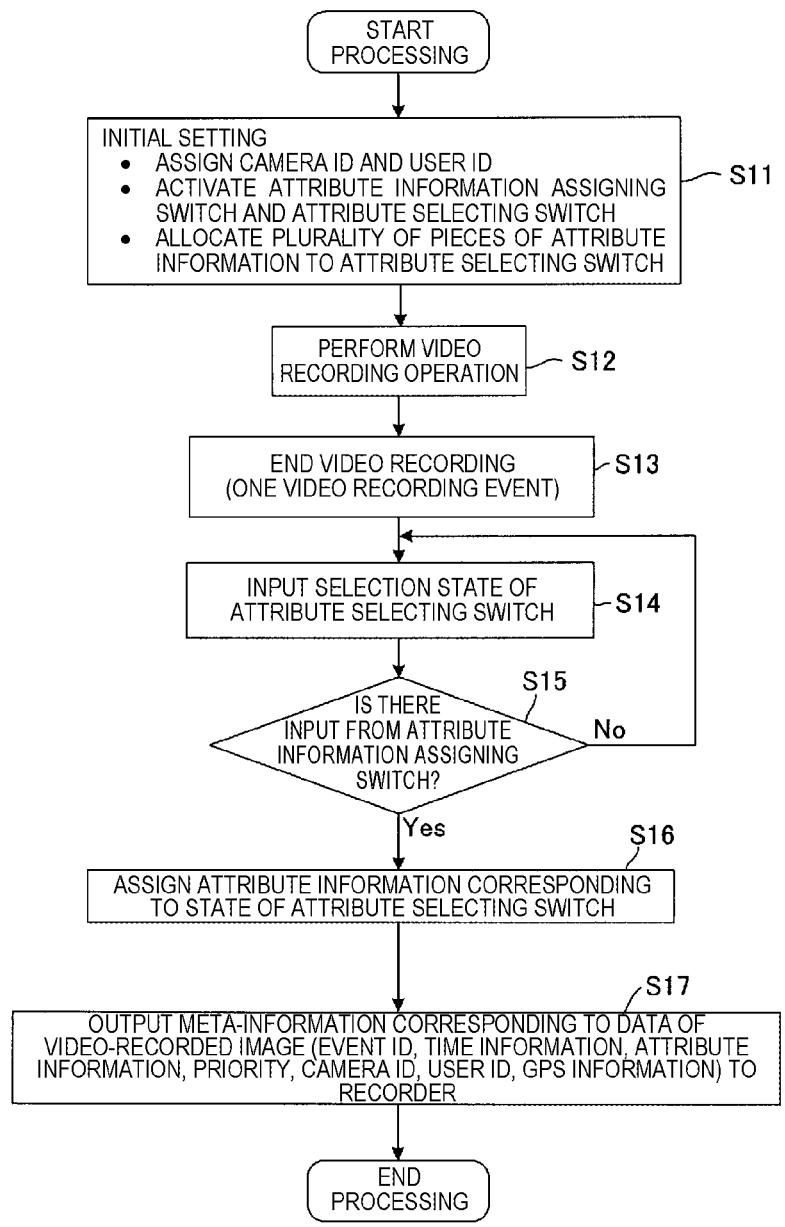
FIG. 17 is a flow chart illustrating an example of a procedure regarding the attribute information assigning operation of the wearable camera, according to the third exemplary example of the present invention.

FIG. 17 is a flow diagram illustrating an example of a procedure regarding the attribute information assigning operation in wearable camera 10 of the present exemplary embodiment.

MCU 19 of wearable camera 10 executes an initial setting in advance of the video recording operation (step S11). The initial setting of wearable camera 10 is performed by transmitting the setting information through connection to a PC within a police station and the operation of the PC, for example, when a police officer which is a user is dispatched. As the initial setting, the assignment of camera ID and user ID (see FIG. 16), the validation of attribute information assigning switch SW3 and attribute selecting switch SW4, the allocation of a plurality of pieces of attribute information to attribute selecting switch SW4 (see FIG. 7) are executed.

When the input of video recording switch SW1 is detected, MCU 19 starts the video recording operation, executes imaging by capture 11, and store video image data of a moving image in storage 15 (step S12).

When the second input of video recording switch SW1 is detected, MCU 19 terminates the video recording operation of one video recording event (step S13). Subsequently, MCU 19 inputs the selection state of attribute selecting switch SW4 (step S14), and determines the presence or absence of the input of attribute information assigning switch SW3 (step S15).

When the input from attribute information assigning switch SW3 is performed, MCU 19 reads attribute information corresponding to the state of attribute selecting switch SW4 from EEPROM 16, and assigns the attribute information to the video image data (step S16). MCU 19 outputs meta-information including the assigned attribute information to storage 15, terminates the video recording operation immediately before that, and stores the meta-information in association with the stored video image data (step S17). The meta-information includes event ID, time information, attribute information, priority, camera ID, user ID, and GPS information (see FIG. 16). MCU 19 terminates the attribute information assigning process.

Meanwhile, in the above-mentioned example, although a procedure of terminating one video recording event and then assigning the attribute information is illustrated, a procedure may be used in which the input of attribute information assigning switch SW3 may be detected during the continuation of the video recording operation, and the attribute information is assigned during video recording.

In addition, in the above-mentioned example, the attribute information corresponding to the state of attribute selecting switch SW4 is assigned from the attribute information which is allocated to attribute selecting switch SW4 in advance, but attribute information corresponding to a voice emitted by a user can also be assigned using, for example, a voice recognition function.

Next, the transmission operation of the video image data in the present embodiment will be described in more detail.

Figure 18:
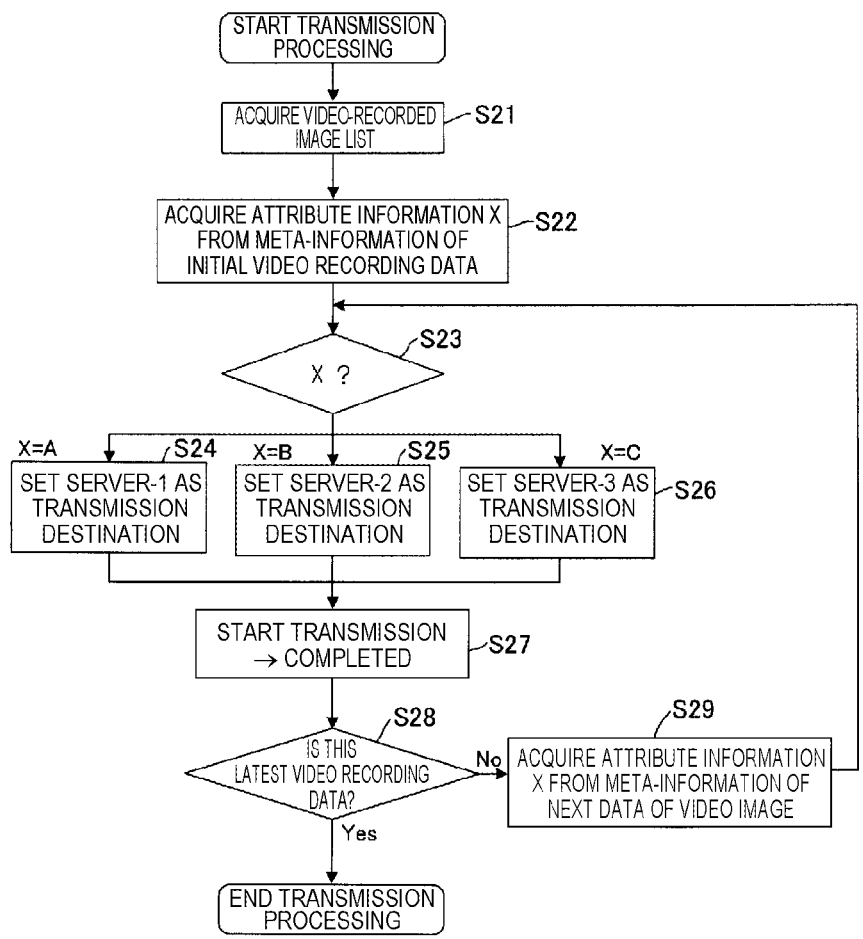
FIG. 18 is a flow chart illustrating an example of a procedure regarding a video image data transmission operation of the wearable camera, according to the third exemplary example of the present invention.

FIG. 18 is a flow diagram illustrating an example of a procedure regarding the video image data transmission operation in wearable camera 10 of the present embodiment.

When communication mode switch SW5 is switched to STA1, MCU 19 of wearable camera 10 is connected to an access point within a police station or under the present system management by communicator 21, and is set to be in a state of being capable of transmitting the video image data. When non-transmitted video recording data is present in storage 15, MCU 19 starts the transmission process of the video image data.

When the transmission of the video image data is performed, MCU 19 acquires a video-recorded image list as shown in FIG. 16 from storage 15 (step S21). MCU 19 acquires attribute information X of the non-transmitted video recording data from the meta-information of the initial video recording data (step S22). Subsequently, MCU 19 determines whether the attribute information X corresponds to any of A, B, and C (step S23). In the setting example of the attribute information shown in FIG. 7, A is equivalent to a traffic accident, B is equivalent to drunken driving, and C is equivalent to over-speed. In addition, in the setting example of the transmission destination based on the attribute information of FIG. 14, the transmission destination of attribute information A is set to Server-1, the transmission destination of attribute information B is set to Server-2, and the transmission destination of attribute information C is set to Server-3.

When attribute information X corresponds to A (traffic accident), MCU 19 sets Server-1 (server SV1) as the transmission destination of the video recording data including the video image data (step S24). The priority of the attribute information corresponding to a traffic accident is set to be High, and the video image data is preferentially transmitted to Server-1. For example, video image data having a high priority is preferentially transmitted to a server having a high line speed during data transmission. Here, Server-1 (server SV1) is set to a transmission destination of video image data having a high priority. In addition, when attribute information X corresponds to B (drunken driving), MCU 19 sets Server-2 (server SV2) as the transmission destination of the video recording data including the video image data (step S25). In addition, when attribute information X corresponds to C (over-speed), MCU 19 sets Server-3 (server SV3) as the transmission destination of the video recording data including the video image data (step S26).

MCU 19 starts to transmit the video recording data including the video image data to a server of the set transmission destination, and completes this transmission operation (step S27). Next, MCU 19 determines whether the transmitted video recording data is final video recording data (step S28), and terminates the transmission process when the video recording data is non-transmitted final video recording data stored in storage 15. When the video recording data is not final video recording data, MCU 19 acquires attribute information X from meta-information of the next video recording data (step S29). Thereafter, MCU 19 executes the processes of steps S23 to S28 similarly, and repeats the processes of steps S23 to S29 until the transmission of the final video recording data is completed.

In this manner, in the third example, when the data of captured video image is transmitted using wearable camera 10, it is possible to set a transmission destination on the basis of the attribute information assigned to the video image data, and to transmit video image data to a predetermined transmission destination based on the attribute information and accumulate the video image data. Therefore, even in an imaging spot in case of urgency, it is possible to reliably set a transmission destination on the basis of the attribute information of the video image data. In addition, it is possible to use a server that performs accumulation on the basis of the attribute information of the video image data, and to perform distribution to each transmission destination in accordance with the attribute information during the transmission of the video image data from wearable camera 10. In addition, video image data having a high priority as the attribute information can be preferentially transmitted to a predetermined server conforming to an operational condition and be accumulated.

According to the third example, since the transmission destination can be easily determined by wearable camera 10 in accordance with the attribute information, it is possible to reduce much time and labor during the transmission of data of video-recorded image. Thereby, in wearable camera system, it is possible to improve convenience when the data of captured video image is handled.

As described above, wearable camera 10 of the present embodiment includes capture 11, storage 15 that stores video image data captured by capture 11 and attribute information associated with the video image data, and communicator 21 that transmits the video image data, and includes MCU 19 that sets a transmission destination on the basis of the attribute information of the video image data to be transmitted when the video image data stored in storage 15 is transmitted, and transmits the video image data using communicator 21.

As described above, by setting the transfer destination of the video image data captured by the capture 11 based on the attribute information which is associated with the video image data, and transferring the video image data to the transfer destination, it is possible to easily transfer the video image data to the predetermined transfer destination corresponding to the attribute information to accumulate the video image data. In addition, the server in which the video image data is accumulated according to the attribute information can be selectively used, and thus, it is possible to distribute the video image data to each transfer destination according to the attribute information when transferring the video image data from wearable camera 10. In addition, the video image data having a high priority in view of attribute information can be transferred to the predetermined server which matches with the operation condition and be accumulated.

In addition, in wearable camera 10 in the third embodiment, the transfer destination can be set with respect to each of a plurality of attribute information items as the transfer destination of the video image data, and at least two or more different transfer destinations can be set according to the attribute information. In this way, it is possible to assign the different transfer destinations with respect to at least two or more different attribute information items, and thus, it is possible to distribute the video image data to each transfer destination according to the attribute information when transferring the video image data from wearable camera 10.

In addition, in wearable camera 10 in the third embodiment, MCU 19 sets the transfer destination according to the attribute information of the video image data to be transferred with respect to the video image data immediately before capture 11 finishes the recording or the non-transferred video image data, and transfers the video image data to the set transfer destination to cause the video image data to be recorded. In this way, it is possible to easily set the transfer destination based on the attribute information with respect to the video image data immediately before the recording being finished or a non-transferred video image data, and to transfer the video image data to each transfer destination.

In addition, in wearable camera 10 in the third embodiment, the priority can be set to the attribute information, and MCU 19 sets the transfer destination according to the priority of the attribute information, and preferentially transfers the video image data having a higher priority. In this way, the transfer destination can be set by the priority of the attribute information, and thus, it is possible to preferentially transfer the video image data having a higher priority to the appropriate transfer destination.

In addition, in wearable camera 10 in the third embodiment further includes an operation input unit that inputs the operation by the user. The operation input unit includes attribute information assigning switch SW3 that inputs the operation of assigning the attribute information relating to the video image data and attribute information selecting switch SW4 that inputs the operation of selecting the attribute information. In a case where the assigning operation is input from attribute information assigning switch SW3, MCU 19 assigns the attribute information corresponding to the setting state of attribute information selecting switch SW4 to the video image data, and then, stores the video image data in storage unit 15. In this way, by an operation of standalone wearable camera 10, it is possible to easily assign the attribute information to the recorded video image data.

Next, a fourth embodiment will be described. When a policeman equipped with a single wearable camera captures the situation of the site where the policeman rushed to arrive at in response to an emergency call-out, in a case where there is provided only a single wearable camera, once the wearable camera is mounted, usually the mounted position can not be changed. Therefore, the range of capturing is limited and thus, there is case where it is difficult to accurately and widely capture the situation of the site using a single wearable camera. Therefore, the convenience for handling the recorded video image data deteriorates. In order to cope with this problem, in the fourth embodiment, a wearable camera system and a method of capturing are provided, which assists accurate and wide capturing of a situation of a site by a policeman and improves the convenience of handling the data of capture video image.

Hereinafter, the embodiment (hereafter, referred to as "the present embodiment") in which the wearable camera system and a method of capturing in the fourth embodiment are specifically disclosed will be described in detail with reference to the drawings. The wearable camera system in the present embodiment is configured to include a first camera and a second camera with which can be equipped by a user (for example, a policeman OF, similarly below) on his/her body, clothes, head, or the like. In the present embodiment the policeman changes the camera from the first camera to the second camera when capturing the image with the first camera firstly, or changes the camera from the second camera to the first camera when capturing the image with the second camera firstly. In addition, when the policeman captures the image using any one of the wearable cameras of the first camera and the second camera, the policeman captures the image both of the wearable camera by adding the other wearable camera.

Figure 19:
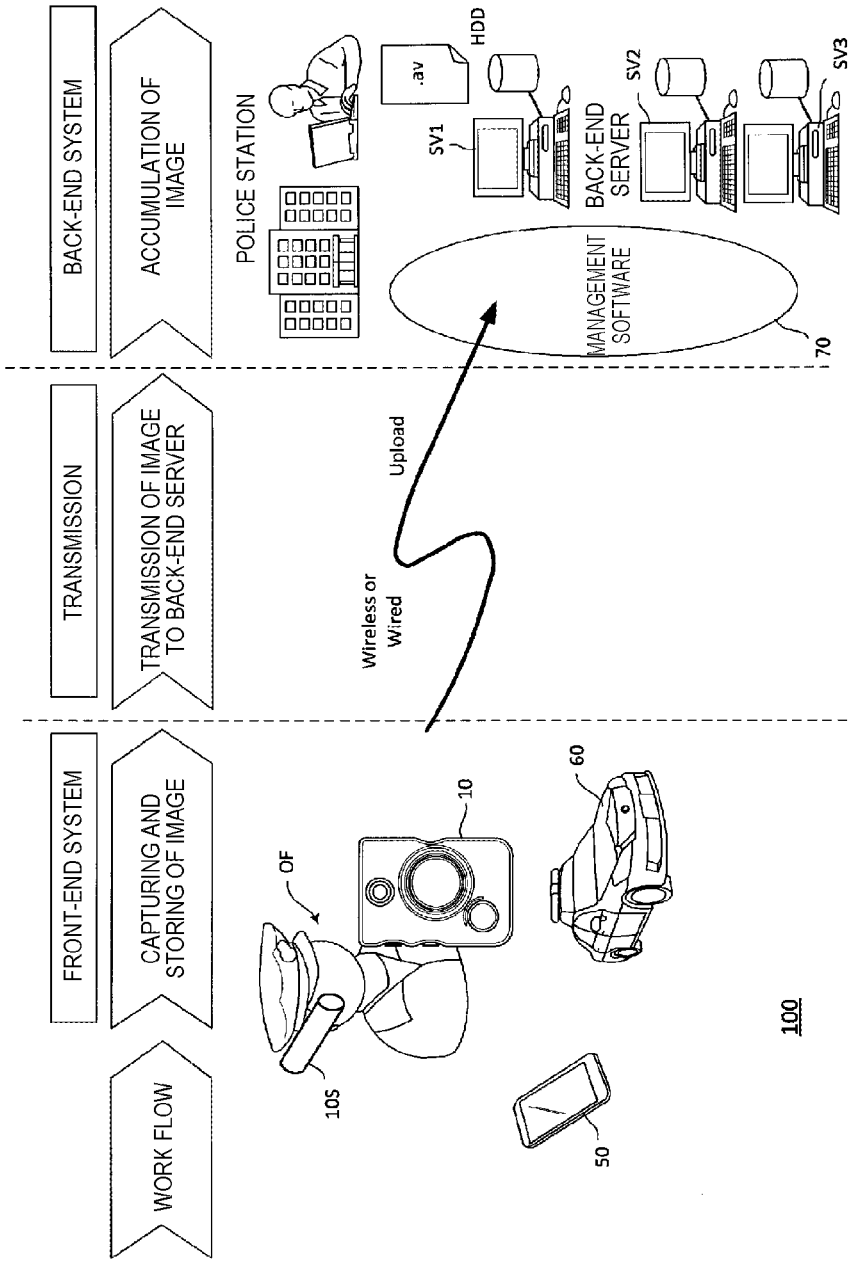
FIG. 19 is an explanatory diagram regarding an overview of the wearable camera system and usage of the data of a video image captured by the wearable cameras (a first camera and a second camera), according to a fourth exemplary example of the present invention.

FIG. 19 is an explanation diagram relating to the outline of wearable camera system 100 in the present embodiment and use of the data of video images captured by the wearable cameras (first camera 10 and second camera 10S). The same reference numbers will be given to the components having basically the same configurations as in the first to third embodiments. In wearable camera system 100 in the present embodiment, first camera 10, second camera 10S, or both of first camera 10 and second camera 10S which are the wearable cameras which can be equipped by the user (for example, policeman OF) on his/her body, clothes, head, or the like are used.

First camera 10 is a wearable camera having a communication function for performing a communication between mobile terminal 50 such as a smart phone or the like, vehicle-mounted system 60 mounted on a vehicle (for example, a patrol car), or servers (back-end servers SV1, SV2, and SV3) disposed in an organization of the user.

Second camera 10S is a wearable camera having a communication function for performing a communication with first camera 10. The first camera 10 and second camera 10S are connected to each other via a cable CB (refer to FIG. 20).

In addition, in wearable camera system 100, first camera 10, second camera 10S, mobile terminal 50, vehicle-mounted system 60 configure a front end system, and management software 70 on the network and back-end server SV1, SV2, and SV3 configure the back-end system.

Hereinafter, to describe the present embodiment clearly, as an example of a pattern for using wearable camera system 100, it is assumed that the policeman OF in a police station wears and uses first camera 10 and second camera 10S (refer to FIG. 20). In this case, policeman OF performs capturing the image by any one of first camera 10 or second camera 10S, or performs capturing the image by both of first camera 10 or second camera 10S. First camera 10 transfers the video image data obtained by first camera 10, second camera 10S, or both thereof to the back-end system deployed in the police station. The video image data transferred form first camera 10 is accumulated in back-end servers SV1, SV2, and SV3. Not limited to policeman OF, first camera 10 may be used by various other business area (for example, a security company).

The front end system that is illustrated in FIG. 19 is configured to include first camera 10 and second camera 10S that police official OF who is dispatched to the front line of the field can wear, mobile terminal 50 that police official OF carries, and vehicle-mounted system 60 that is mounted within a police car. Mobile terminal 50 is a wireless communication device such as a smartphone, a mobile telephone, a tablet terminal, or a personal digital assistant (PDA). Vehicle-mounted system 60 has a camera, a PC, a communication unit, and makes up a vehicle-mounted camera system, am image managerial system, and the like.

When police official OF who is assigned a predetermined task (for example, patrol) is dispatched from a police station, police official OF wears first camera 10, second camera 10S and carries the mobile terminal 50, rides in the police car that is equipped with the vehicle-mounted system 60, and drives the police car to the field. In the front end system, from example, an image of the field at which the police car arrives is captured by a camera of vehicle-mounted system 60. Furthermore, police official OF gets off the police car and captures a more detailed image of the field, using first camera 10, second camera 10S, or both of them. Image data on a moving image or a static image that is captured by first camera 10, second camera 10S, or both of them is retained in a recoding unit of mobile terminal 50, such as a memory, or in a recording unit, using a storage of a PC of vehicle-mounted system 60, or the like, and is transmitted (uploaded) to a back end system. Furthermore, mobile terminal 50 or vehicle-mounted system 60 transmits various pieces of data including the image data, to the back end system. Transmission of the data to the back end system is performed through the connection to the back end system from the field for wireless communication. However, alternatively, when the patrol is completed and the police official goes back to the police station, the transmission of the data is performed through wired communication, wireless communication, or manually (for example, by carrying a storage medium).

Back end system that is illustrated in FIG. 19 is configured to include back end servers SV1 to SV3 that are installed within the police station or at other places, and management software 70 for performing communication with the front end system. Each of back end servers SV1 to SV3 includes a storage such as a hard disk drive (HDD) inside of or outside of each. In the back end system, the image data and other pieces of data that are transmitted from the front end system are accumulated in back end server SV1 to SV3.

Back end servers SV1 to SV3 receive the image data that is transmitted from first camera 10 or vehicle-mounted system 60, and retains the received image data in the storage such as the hard disk drive (HDD).

The pieces of image data that are accumulated in the back end system, for example, are used by the person in charge who works for the relevant department of the police station. The image data is copied on a predetermined recording medium (for example, a digital versatile disk (DVD)) whenever necessary, and the recording medium is provides as a pieces of evidence in a predetermined scene (for example, a trial).

According to the present embodiment, it is possible to acquire or retain an evidence image of the field in a more exact manner, using first camera 10 and second camera 10S that police official OF wears. When first camera 10 and second camera 10S are used, identification information (a user ID) of a user (police official OF), and identification information (for example, a camera ID) of each of first camera 10 and second camera 10S are set in advance. Thus, when the pieces of image data that are accumulated in the back end server was obtained, as images, by who, using which wearable camera, can be clearly identified in a clearly-distinguishable manner.

Figure 20:
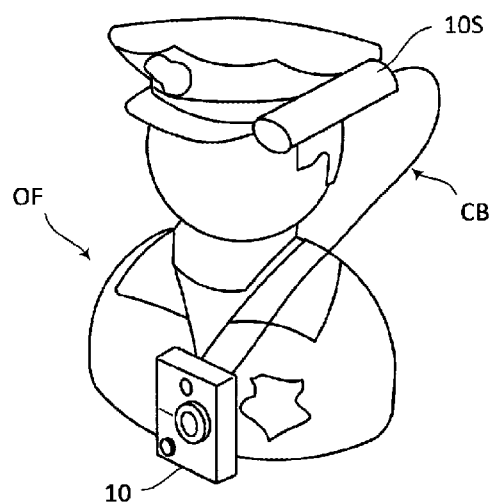
FIG. 20 is a diagram illustrating an example of a state where a police officer is equipped with both the first camera and the second camera, according to the fourth exemplary example of the present invention.

FIG. 20 is a diagram illustrating one example of a state where the police official wears both of first camera 10 and second camera 10S according to the present embodiment. Police official OF wears first camera 10 in the vicinity of a chest portion of his/her uniform or using a case, in a fixed manner, or put first camera 10 into a pocket for carrying. Furthermore, police official OF connects to first camera 10 and second camera 10S through cable CB, and for example, wears second camera 10S in the vicinity of the upper portion of his/her left ear in a fixed manner, using a clip.

In an example in FIG. 20, second camera 10S can capture an image of an object that is at a higher position than an area whose image is captured by first camera 10. Furthermore, while first camera 10 captures an image in the front direction (in the lower left direction on the paper sheet on which FIG. 20 is drawn) of police official OF, second camera 10S may capture an image in the rear direction (in the upper right direction on the paper sheet on which FIG. 2 is drawn) of police official OF. Therefore, one example of a state where police official OF wears first camera 10 and second camera 10S is described referring to FIG. 20, but how police official OF wears first camera 10 and second camera 10S is not particularly limited.

As illustrated in FIG. 20, first camera 10 is worn, for use, on clothes that the user wears or on the body of the user, in such a manner that an image is captured from a view point of a position close to the user's eye, such as the chest of police official OF, that is, the user. Police official OF, who wears first camera 10 and second camera 10S, performs imaging of an photographic subject in the neighborhood by operating recording switch SW1 or recording switch SW1s. As described above, an imaging range of second camera 10S can include a higher position than an imaging range of first camera 10. Police official OF can perform the imaging by switching between first camera 10 and second camera 10S or using both of them, in such a manner that an image of a situation of the field can be captured precisely and widely.

Figure 21:
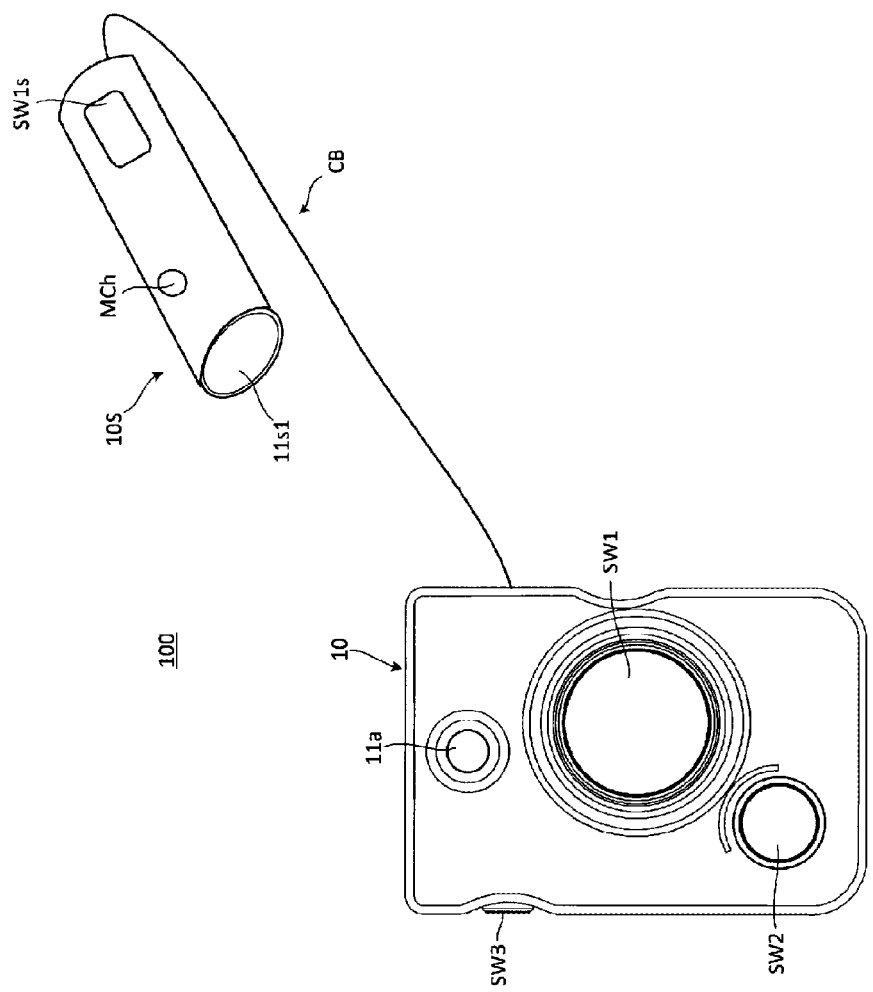
FIG. 21 is a diagram illustrating an example of the appearance of the first camera and the second camera, according to the fourth exemplary example of the present invention.

FIG. 21 is a diagram illustrating one example of external appearances of first camera 10 and second camera 10S according to the present embodiment. In FIG. 21, a state of first camera 10 when viewed from front is illustrated, and a state of second camera 10S when viewed obliquely is illustrated. Imaging lens IIa of imaging unit 11 (refer to FIG. 24), recording switch SW1, and snapshot switch SW2 are provided on the front side of approximately-rectangular parallelepiped-shaped case of first camera 10 that is illustrated in FIG. 21. For example, while pushed down for a predetermined period of time, (for example, approximately one second), recording switch SW1 starts recording (imaging of a moving image). While pushed down for another predetermined period of time (for example, approximately three seconds), recording switch SW1 stops recording. Whenever pushed down, snapshot switch SW2 captures a static image each time.

Imaging lens Iis 1 is provided on the front side (a side that faces first camera 10 that is illustrated in FIG. 21) of an approximately-cylindrical case of second camera 10S that is illustrated in FIG. 21, microphone hole MCh through which microphone 11s6 is exposed is provided in front of the case (in the lower left direction of the paper sheet on which FIG. 21 is drawn), and recording switch SW1sis provided in rear of the case (in the upper right direction of the paper sheet on which FIG. 21 is drawn).

Figure 22:
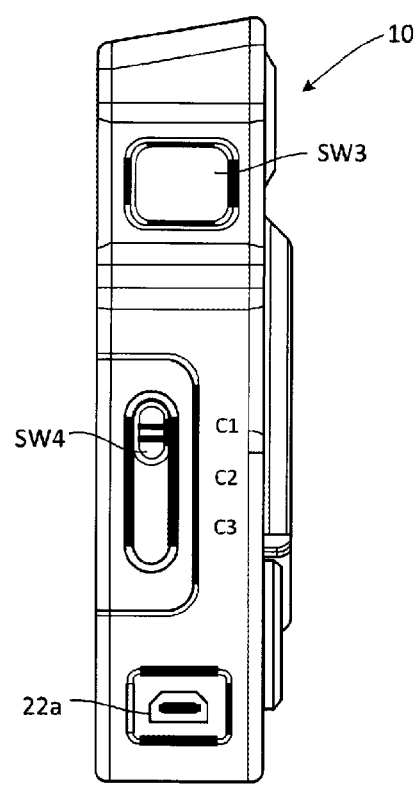
FIG. 22 is a left side view illustrating an example of the appearance of the first camera, according to the fourth exemplary example of the present invention.

FIG. 22 is a left-side diagram illustrating one example of first camera 10 according to the present embodiment. Illustrated in FIG. 22, attribute information assignment switch SW3, attribute selection switch SW4, USB connector 22a are provided on the left side when viewed from the front side of the case of first camera 10. By police official OF pushing down attribute information assignment switch SW3, attribute information according to a selection state of attribute selection switch SW4 is assigned to image data (hereinafter, referred to as "first image data") that is obtained by the imaging and the recording by first camera 10, image data (hereinafter referred to as "second image data) whose image is captured by second camera 10S and is stored (recorded) by first camera 10, or image data that results from combining the first image data and the second image data. Attribute selection switch SW4 is a slide switch that has three-step connection positions, that is, C1, C2, and C3. Police official OF selects the attribution information that is allocation-set each of C1 to C3, for designation. An external device (for example, first camera 10, vehicle-mounted system 60, or the PC within the police station) is connected to the USB connector 22a through a cable that corresponds to a Universal Serial Bus (USB) and thus transmission and reception of data are possible.

Figure 23:
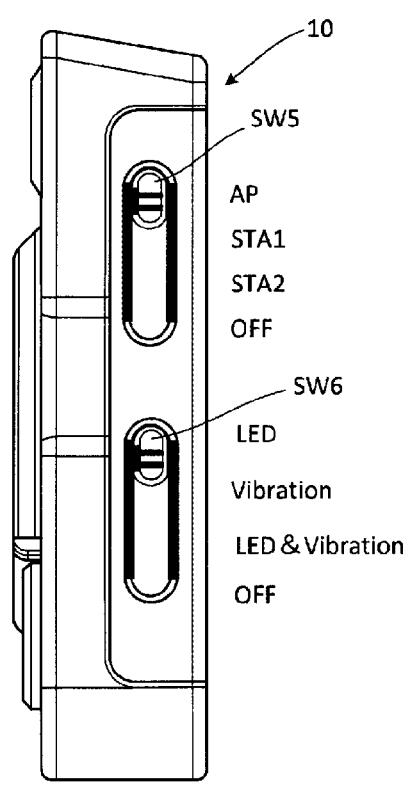
FIG. 23 is a right side view illustrating an example of the appearance of the first camera, according to the fourth exemplary example of the present invention.

FIG. 23 is a right-side diagram illustrating one example of first camera 10 according to the present embodiment. As illustrated in FIG. 23, communication mode switch SW5 and indicator switch SW6 are provided on the right side when viewed from the front side of the case of first camera 10. Communication mode switch SW5 is a switch that has four-step connection positions, that is, AP, STA1, STA2, and OFF. Police official OF selects a communication mode of first camera 10 for designation. The AP is an access point mode in which first camera 10 that is the wearable camera operates as an access point of a local area network (LAN), and connects to mobile terminal 50 in a wireless manner, and communication is performed between first camera 10 and mobile terminal 50. In the access point mode, mobile terminal 50 connects to first camera 10, and thus display of a current live image captured by first camera 10, reproduction of the image that is recorded, assignment of the attribute information, display of the static image that is captured, and the like can be performed. The STA1 and STA2 are station modes in which, in the case of the connection to an external device through the wireless LAN, the communication is performed with the external device serving as the access point. The STA1 is a mode in which a connection to an access point within the police station is made. The STA2 is a mode in which a connection to vehicle-mounted system 60. In the station mode, setting of first camera 10, transmission (upload) of the image data in first camera 10, and the like are performed. The OFF is a mode in which a communication operation through the wireless LAN is turned off and the wireless LAN is set to be not in use.

In the illustrated example, indicator switch SW6 is a slide switch having contact point positions of four stages of LED, Vibration, LED & Vibration, and OFF. Police officer OF selects and designates the notification mode of first camera 10. LED is a mode for displaying an operational state of first camera 10 in recording and the like, for example, through LEDs 26a to 26c. Vibration is a mode for issuing notification of an operational state of first camera 10 through vibration of vibrator 27. LED & Vibration is a mode for issuing notification of an operational state of first camera 10 through the displaying of LEDs 26a to 26c and vibration of vibrator 27. OFF is a mode for turning off the notification operation of an operational state.

LEDs 26a to 26c are disposed on the top face when viewed in front of the casing of first camera 10. Accordingly, the LEDs can be easily and visually recognized by a user in a state of being equipped with first camera 10, and no one else can see the LEDs except the user oneself. Contact terminal 23 is provided on the bottom face of the casing of first camera 10 when viewed in front thereof.

Figure 24:
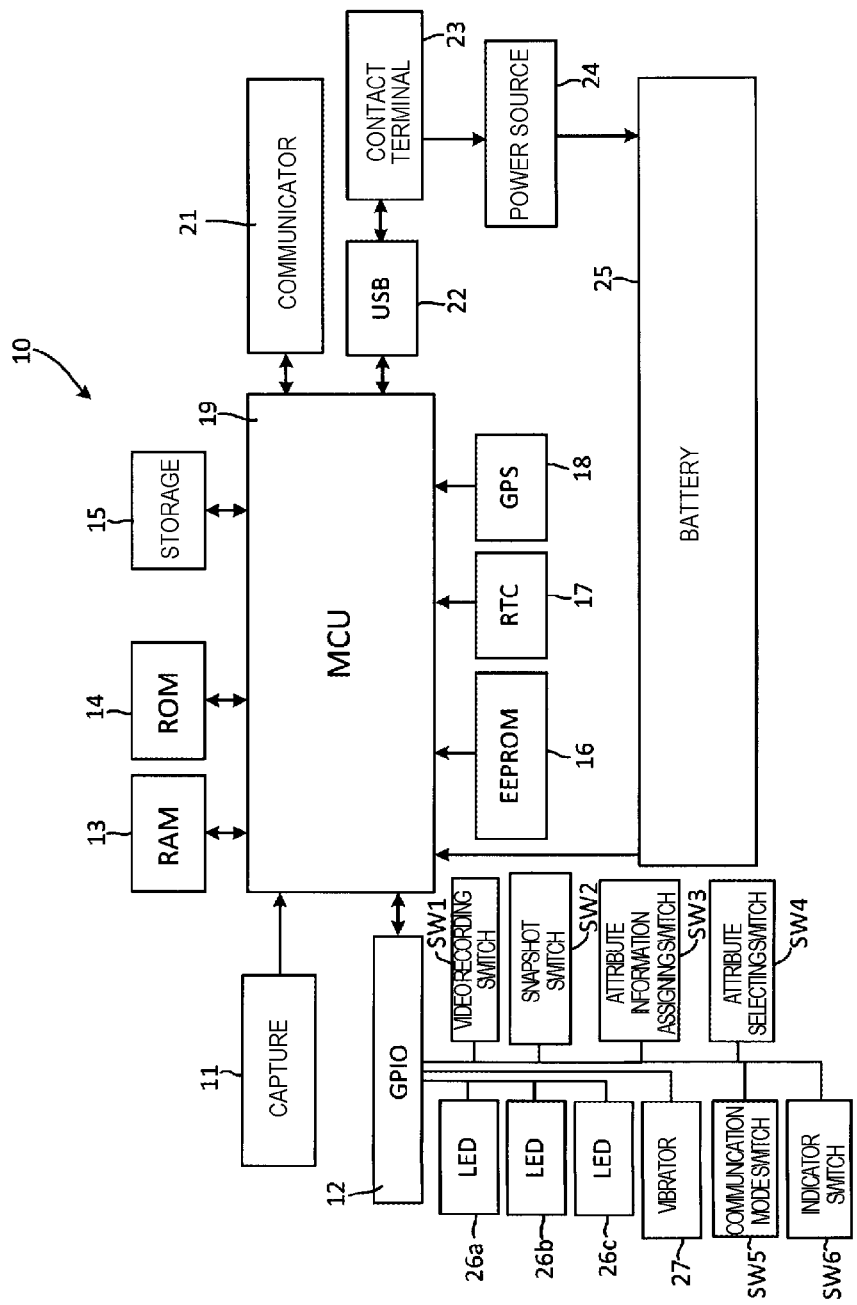
FIG. 24 is a block diagram illustrating an example of an internal configuration of the first camera, according to the fourth exemplary example of the present invention.

FIG. 24 is a block diagram illustrating an example of an internal configuration of first camera 10, according to the exemplary example of the present invention. First camera 10 illustrated in FIG. 24 includes capture 11, general purpose input/output (GPIO) 12, RAM 13, ROM 14, storage 15, electrically erasable programmable read-only memory (EEPROM) 16, real time clock (RTC) 17, global positioning system (GPS) 18, micro control unit (MCU) 19, communicator 21, universal serial bus (USB) 22, contact terminal 23, power source 24, and battery 25. As an example of operation input sections, first camera 10 is configured to include video recording switch SW1, snapshot switch SW2, attribute information assigning switch SW3, attribute selecting switch SW4, communication mode switch SW5, and indicator switch SW6. As an example of state displays, first camera 10 is configured to include three light emitting diodes (LED) 26a, 26b, and 26c, and vibrator 27.

Capture 11 has image capturing lens 11a, and a solid-state imaging device such as a charge coupled device-type (CCD) image sensor or a complementary metal oxide semiconductor-type (CMOS) image sensor, and outputs data of a video image of an imaging target obtained through image capturing to MCU 19.

GPIO 12 is a parallel interface through which signals are input and output between video recording switch SW1, snapshot switch SW2, attribute information assigning switch SW3, attribute selecting switch SW4, communication mode switch SW5, indicator switch SW6, LEDs 26a to 26c, and vibrator 27; and MCU 19.

RAM 13 is a working memory which is used when operating MCU 19.

ROM 14 is a memory in which programs and data for controlling MCU 19 are stored in advance.

Storage 15 is configured with, for example, a storage medium such as an SD memory, and stores image data (first image data) obtained and captured by capture 11, or second image data transmitted from second camera 10S. When using the SD memory as storage 15, it is possible to attach and detach first camera 10 to and from a main body of a case.

EEPROM 16 stores identification information for identifying first camera 10 (for example, a camera ID indicated by, for example a serial number), and other piece of setting information which is input through the initial setting (for example, allocation information between attribute selecting switch SW4 and each piece of attribute information corresponding to C1, C2, and C3).

RTC 17 counts current time information and outputs the information to MCU 19.

GPS 18 receives the current position information of first camera 10 from a GPS transmitter and outputs the current position information to MCU 19.

MCU 19 has a function as a control unit, and performs a control process for overall controlling the operation of each unit of first camera 10, an input and output process of data between each unit and the other unit, an operation (calculation) process of data, and a storage process of data, and operates in accordance with programs and data stored in ROM 14. MCU 19 obtains the current time information from RTC 17 and the current position information from GPS 18, respectively, by using RAM 13, during an operation.

Communicator 21 specifies connection between communicator 21 and MCU 19, for example, in a physical layer which is a first layer of an open systems interconnection (OSI) reference model, and performs wireless communication (for example, Wifi (registered trademark)) through, for example, a wireless LAN (W-LAN) in accordance with the specification. Communicator 21 to be used may perform wireless communication such as Bluetooth (registered trademark).

USB 22, which is a serial bus, allows first camera 10 to be connected to in-car system 60 or a PC or the like in a police station.

Contact terminal 23, which is a terminal for electrical connection to a cradle, an external adaptor, and the like, is connected to MCU 19 via USB 22, and is connected to power source 24. First camera 10 can be charged and communication of data including video image data can be performed via contact terminal 23. Contact terminal 23 is provided with, for example, "charge terminal V+", "CON-.DET terminal", "data terminals D− and D+", and "ground terminal". CON.DET terminal is a terminal for detecting a variation in voltage. Data terminals D− and D+ are terminals for transmitting video image data captured by first camera 10, which is a wearable camera, and the like to an external PC or the like, for example, via a USB connector terminal. Contact terminal 23 and a connector of a cradle or an external adaptor are connected to each other, and thus data communication can be performed between first camera 10 and an external apparatus.

Power source 24 supplies electricity for power supplied from a cradle or an external adaptor via contact terminal 23 to battery 25, thereby charging battery 25. Battery 25 is constituted by a rechargeable secondary battery and supplies electricity for power to each of the units of first camera 10 which is a wearable camera.

Video recording switch SW1 is a push button switch for inputting an operational instruction to perform the start/stop of video recording (capturing of a moving image) through a pressing operation of a police officer OF.

Snapshot switch SW2 is a push button switch for inputting an operational instruction to perform image capturing of a still image through a pressing operation of a police officer OF.

Attribute information assigning switch SW3 is a push button switch for inputting an operational instruction to assign attribute information to video image data through a pressing operation of a police officer OF.

Attribute selecting switch SW4 is a slide switch for inputting an operational instruction to select an attribute to be assigned to video image data.

Communication mode switch SW5 is a slide switch for inputting an operational instruction to set a communication mode between first camera 10 and an external apparatus.

Indicator switch SW6 is a slide switch for inputting an operational instruction to set an operational state display mode by LEDs 26a to 26c and vibrator 27. Video recording switch SW1, snapshot switch SW2, attribute information assigning switch SW3, and attribute selecting switch SW4 are configured to be easily operable even in a case of emergency dispatch of a police officer OF. Each of video recording switch SW1, snapshot switch SW2, attribute information assigning switch SW3, attribute selecting switch SW4, communication mode switch SW5, and indicator switch SW6 is not limited to the above-described configuration. The switch may be an operational input device, having a different configuration, which allows a police officer OF to input an operational instruction.

LED 26a displays a power-supply state (ON-OFF state) of first camera 10 and a state of battery 25.

LED 26b displays a state of an image capturing operation (video recording state) of first camera 10.

LED 26c displays a state of a communication mode of first camera 10.

MCU 19 detects the pressing of each of video recording switch SW1, snapshot switch SW2, attribute information assigning switch SW3, attribute selecting switch SW4, communication mode switch SW5, and indicator switch SW6, and performs processing on the pressing of the operated switch. For example, when a pressing operation of video recording switch SW1 is detected, MCU 19 controls the start or stop of an image capturing operation in capture 11, and stores the captured data obtained by capture 11 in storage 15 as video image data of a moving image. For example, when a pressing operation of snapshot switch SW2 is detected, MCU 19 stores the captured data obtained by capture 11 when snapshot switch SW2 is operated, in storage 15 as video image data of a still image.

For example, when an operational input of attribute information assigning switch SW3 is detected, MCU 19 assigns preset attribute information to video image data, and stores the information in storage 15 in association with the video image data. At this time, association information indicating an associated relationship between the selection state of attribute selecting switch SW4 and any attribute information is held in EEPROM 16, and MCU 19 detects the selection state of attribute selecting switch SW4, thereby assigning attribute information corresponding to the selection state of attribute selecting switch SW4. MCU 19 detects the state of communication mode switch SW5, and operates communicator 21 in accordance with a communication mode corresponding to the setting of communication mode switch SW5. When a video recording operation starts, MCU 19 detects the state of indicator switch SW6 and notifies the outside of the state of the video recording operation through the LED display and/or vibrations of the vibrator, in accordance with the setting of indicator switch SW6.

Figure 25:
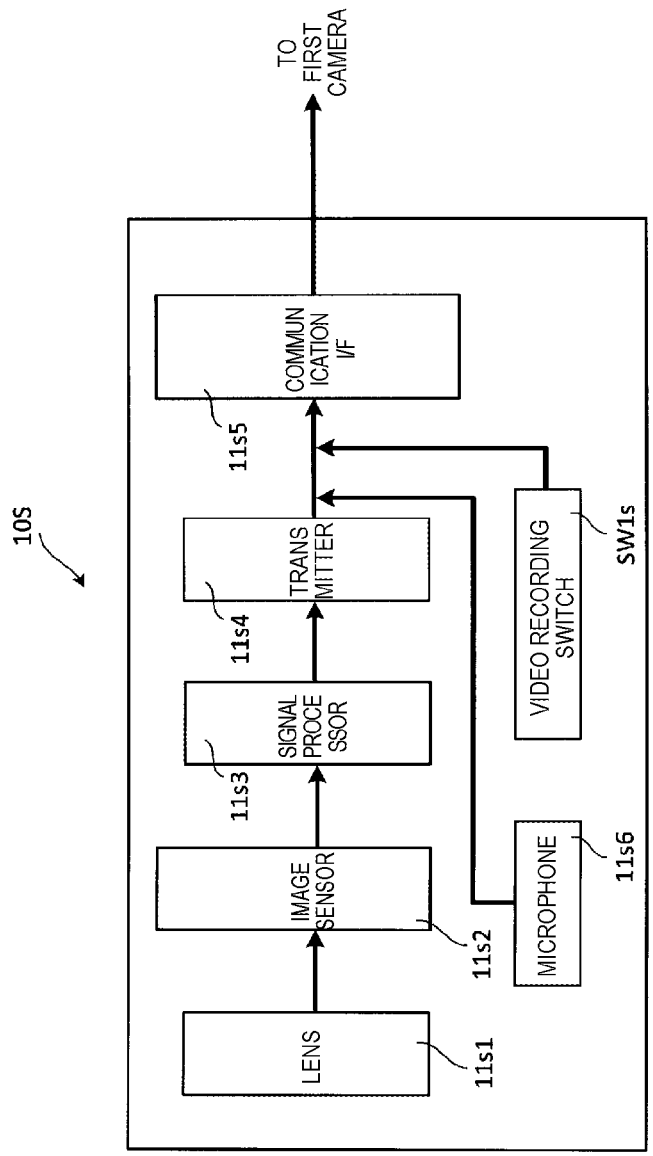
FIG. 25 is a block diagram illustrating an example of an internal configuration of the second camera, according to the fourth exemplary example of the present invention.

FIG. 25 is a block diagram illustrating an example of an internal configuration of second camera 10S according to the present exemplary embodiment. Second camera 10S illustrated in FIG. 25 is configured to include imaging lens 11s1, image sensor 11s2, signal processor 11s3, transmitter 11s4, communication OF 11s5, microphone 11s6, and video recording switch SW1s.

Lens 11s1 condenses ambient light incident from the outside of second camera 10S, thereby forming an image on an imaging surface of image sensor 11s2.

Image sensor 11s2 is configured by a solid-state imaging device such as, for example, a CCD or a CMOS, and converts an optical image formed on the optical image into an electrical signal. The output of image sensor 11s2 is input to signal processor 11s3.

Signal processor 11s3 generates a frame of image data in an RGB (red, green, blue) format which is recognizable by a person or image data specified by YUV (luminance (Y) and color difference (U, V)) by using the output of image sensor 11s2, and outputs the generated frame to transmitter 11s4.

Transmitter 11s4 generates encoded data for conversion into a data format in which image data can be stored and transmitted, by suing the frame of image data which is generated by the signal processor 11s3, and outputs the generated data to communication I/F 11s5.

Communication I/F 11s5 outputs (transmits) the output from transmitter 11s4 (that is, frame of image data), the output from microphone 11s6 (that is, sound data), or the output from video recording switch SW1s(that is, signal related to an operation for the start/stop of video recording) to first camera 10 via cable CB.

Microphone 11s6 collects sounds around second camera 10S (for example, sounds in the scene to which a police officer OF is rushed), and outputs data of the collected sounds to communication I/F 11s5.

Video recording switch SW is a push button switch for inputting an operational instruction to perform the start/stop of video recording (capturing of a moving image) through a pressing operation of a police officer OF. A signal related to an operation detected by video recording switch SW is input to communication I/F 11s5. The operation for the start/stop of video recording by video recording switch SW1sis the same as the operation for the start/stop of video recording by video recording switch SW1 of first camera 10.

Subsequently, a description will be given regarding the assigning of attribute information to video image data in first camera 10 according to the present exemplary embodiment. In wearable camera system 100, it is assumed that first camera 10 uses video image data obtained by transmitting first video image data captured by first camera 10 switched from second camera 10S, second video image data captured by second camera 10S switched from first camera 10, or the first video image data and the second video image data which are captured by both first camera 10 and second camera 10S to back-end servers SV1 to SV3 and accumulating the data.

In this case, target video image data is extracted from the accumulated video image data on the basis of any attribute information, such as the class of contents of the video image, a user of the imaging, the date, or the place, which is related to the video image data, and is reproduced. When the video image data has no attribute information, it is difficult to determine what the video image is obtained by capturing, and thus the target video image data cannot be extracted. Therefore, it is necessary to assign attribute information when many pieces of video image data are accumulated.

In the present exemplary embodiment, it is possible to assign classification information (Classify) indicating the class of contents of video image as attribute information and to distribute video image data for each class. The attribute information is not limited to classification information, and all pieces of information related to the recorded video image data are included. The classification information as attribute information may be configured to have a hierarchical structure, or may be categorized according to a plurality of systems having different classes.

When a police officer OF leaves the scene captured by first camera 10, second camera 10S, or both first camera 10 and second camera 10S and assigns attribute information later by a PC or the like in a police officer, the police officer OF determines classes while reproducing video image data and assigns attribute information, which requires time and labor. When pieces of video image data which are not assigned attribute information are accumulated, the confirmation of the individual pieces of video image data requires labor, and the determination of a class and the assignment of attribute information require much labor. Consequently, the present exemplary embodiment provides a configuration example of first camera 10 in which attribute information can be easily assigned immediately after or during video recording.

Figures 26, 27:
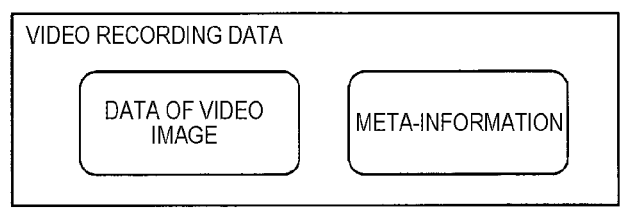
FIG. 26 is a diagram illustrating an example of a relationship between an attribute selecting switch and the attribute information, according to the fourth exemplary example of the present invention.
FIG. 27 is a diagram illustrating an example of data structure of the video recording data, according to the fourth exemplary example of the present invention.

FIG. 26 is a diagram illustrating an example of a relationship between attribute selecting switch SW4 and the attribute information. When first camera 10 is used, as illustrated in FIG. 8, the attribute information is set and allocated in association with each of states (contact point positions) C1 to C3 of attribute selecting switch SW4. The illustrated example is given on an assumption of a case where police officer OF captures circumstantial images of the scene of an incident, C1 is allocated to traffic accident, C2 is allocated to drunken driving, and C3 is allocated to speeding respectively. The allocation of the attribute information is set by selecting the attribute information which is most frequently used by police officer OF, among the pieces of the attribute information in multiple definitions. The contents of the table illustrated in FIG. 26 (in other words, information defining the relationship between attribute selecting switch SW4 and the attribute information) are stored in EEPROM 16 of first camera 10 as one piece of the setting information.

FIG. 27 is a diagram illustrating an example of data structure of the video recording data. FIG. 28 is a diagram illustrating a first example of the video-recorded image list. In first camera 10 according to the present exemplary embodiment, when storing a recorded video image data in storage 15, as illustrated in FIG. 27, together with a captured video image data, meta-information including the attribute information which is associated with the video image data is generated, and both the pieces of data are stored in storage 15 as video recording data in which both the pieces of data are associated with each other. In other words, the video recording data stored in storage 15 includes the video image data and the meta-information.

When transmitting the video image data to back-end servers SV1 to SV3, first camera 10 transmits and accumulates the video recording data including the video image data and the meta-information. The video recording data illustrated in FIG. 27 is a second video image data captured by second camera 10S, when a camera is switched from first camera 10 to second camera 10S. The video recording data is a first video image data captured by first camera 10, when a camera is switched from second camera 10S to first camera 10. The video recording data includes both a first video image data and a second video image data which are respectively captured by first camera 10 and second camera 10S, when either first camera 10 or second camera 10S captures an image first and then the other camera is added later and used for capturing.

The meta-information in association with the video image data is stored, for example, as the video-recorded image list illustrated in FIG. 28. The meta-information of the video-recorded image list includes an event ID, time information, a camera ID, a user ID, recording camera information, attribute information, and GPS information. The event ID is identification information for identifying the event of video recording.

In the present exemplary embodiment, first camera 10 defines one session of a video recording operation from the start of video recording until the end of video recording as one event, and assigns an event ID to each event (hereinafter, also referred to as the video recording event) of video recording operation. As the event ID, the file name or the like of the video image data may be applied. The time information is time information of each video recording event, and the start time of video recording is assigned, for example. As the time information, in addition to the assignment of the start time of video recording, the start time of video recording and the end time of video recording, the start time of video recording and the duration time of video recording, the time when the attribute information is assigned during recording, the time when the wearable camera to be used for capturing is switched, the time when the wearable camera to be used for capturing is added, and the like may be used.

The camera ID is identification information for identifying each of first camera 10 and second camera 10S. The user ID is identification information of police officers OF who uses first camera 10, second camera 10S, or both of them. When first camera 10, second camera 10S, or both of them is used, the camera ID and the user ID are set so as to identify who performs video recording by using which camera.

The recording camera information is information indicating how first camera 10 and second camera 10S are used and video recording is performed by a police officer indicated by the user ID, for each event.

Specifically, in the event ID "Event001", the recording camera information is information indicating that second camera 10S is first used for capturing, but first camera 10 is used by being switched in the middle of the same video recording event (see second camera→first camera). Therefore, in the event ID "Event001", the camera ID is "BWC0001" indicating first camera 10.

In the event ID of "Event002", the recording camera information is information indicating that first camera 10 is first used for capturing, but second camera 10S is used by being switched in the middle of the same video recording event (see first camera→second camera). In this case, in the event ID "Event002", the camera ID is "BWC0002" indicating second camera 10S.

In the event ID of "Event003", the recording camera information is information indicating that first camera 10 is used for capturing from the start to the end of video recording (see only first camera). In this case, the camera ID is "BWC0001" indicating first camera 10.

In the event ID "Event004", the recording camera information is information indicating that first camera 10 is first used for capturing, and second camera 10S is also used by being switched from first camera 10 in the middle of the same video recording event (see first camera/second camera). In addition, in the event ID "Event004", attribute information "speeding" is assigned to the first video image data captured by first camera 10, at "22:00:10on Dec. 2, 2014", and attribute information "drunken driving" is assigned to the second video image data captured by second camera 10S, at "22:10:50 on Dec. 2, 2014". Therefore, in the event ID "Event004", the camera ID is defined as both "BWC0001" indicating first camera 10 used before being switched and "BWC0002" indicating second camera 10S used after being switched.

In addition, even in the case where a camera is switched from first camera 10 to second camera 10S, or vice versa, first camera 10 can allocate different piece of attribute information to the first video image data captured by first camera 10 or the second video image data captured by second camera 10S.

The attribute information is classification information for identifying the type of a video image data, and is allocated based on the information indicating the relationship between the selected state of attribute selecting switch SW4 and the attribute information illustrated in FIG. 8, in accordance with the operation of attribute information assigning switch SW3 and attribute selecting switch SW4 by police officer OF. The GPS information is position information indicating where the recording of the video image data is made, for example, the current position information at the start time of video recording is acquired from GPS 18 and GPS information is allocated by MCU 19. Each piece of meta-information described above is allocated, for example, at the start time of video recording, during video recording, or immediately after the end of video recording by the process of MCU 19, and is stored in storage 15 in association with the video image data.

Figure 29:
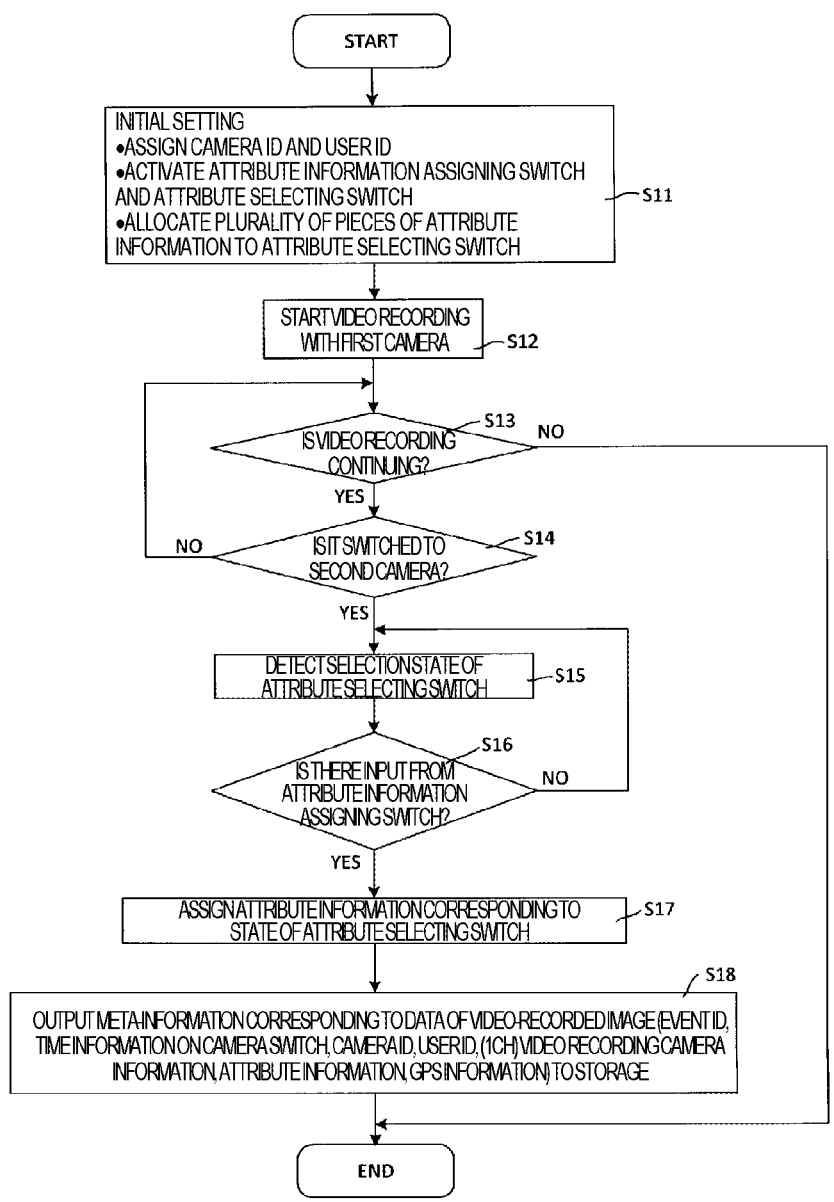
FIG. 29 is a flow chart illustrating an example of an operational procedure of the wearable camera system in which the wearable camera applied to one-channel video recording is switched and one piece of the attribute information is assigned to one piece of the video recording data video-recorded by the wearable camera applied after being switched, according to the fourth exemplary example of the present invention.

Next, in wearable camera system 100 of the embodiment, a switching operation of a wearable camera applied for one-channel video recording (in other words, video recording using first camera 10 or second camera 10S), and an operation of assigning one piece of attribute information to one piece of video recording data that is recorded by a wearable camera applied after being switched will be described with reference to FIG. 29. FIG. 29 is a flow chart illustrating an example of an operational procedure of the wearable camera system in which the wearable camera applied to one-channel video recording is switched and one piece of the attribute information is assigned to one piece of the video recording data that is recorded by the wearable camera applied after being switched, according to the present exemplary embodiment.

In FIG. 29, MCU 19 of first camera 10 performs the initial setting of first camera 10 prior to the video recording operation illustrated in step S12 (S11). The initial setting of first camera 10 is performed, for example, by police officer OF assessing the PC in the police station, operating the PC and transmitting the various types of setting information (for example, a camera ID and a user ID), when police officer OF is dispatched. As the initial setting, MCU 19 performs the assigning of the camera ID and the user ID (see FIG. 28), the activation of attribute information assigning switch SW3 and attribute selecting switch SW4, the allocation of a plurality of pieces of attribute information corresponding to the selected state of attribute selecting switch SW4 (see FIG. 26).

If detecting the press operation of video recording switch SW1 by police officer OF for a constant time (for example, about 1 second), MCU 19 starts the recording operation of the image (video) captured by capture 11, and stores the video image data of a moving image captured by capture 11 in the storage 15 (S12).

Here, when the recording of first camera 10 is not continued (NO in S13), the process of first camera 10 is ended.

On the other hand, when first camera 10 continuously performs video recording (S13, YES), and when the police officer OF switches the wearable camera for imaging a state of an imaging area (for example, scene of accident) from first camera 10 to second camera 10S (S14, YES), second camera 10S starts imaging. Image data of the moving image captured by second camera 10S is transmitted to first camera 10 every time via cable CB while second camera 10S continuously performs imaging.

In order to switch the wearable camera for imaging the state of the imaging area (for example, scene of accident) from first camera 10 to second camera 10S, for example, the police officer OF may connect first camera 10 on video recording to second camera 10S via cable CB. Alternatively, when first camera 10 and second camera 10S are previously connected to each other via cable CB, no operation may be performed on first camera 10, and video recording switch SW1s of second camera 10S may be continuously pressed down for a certain period of time (for example, approximately one second). In any case, according to the present embodiment, the above-described simple operation enables the police officer OF to switch the wearable camera for imaging the state of the imaging area (for example, scene of accident) from first camera 10 to second camera 10S.

On the other hand, when the police officer OF does not switch the wearable camera for imaging a state of an imaging area (for example, scene of accident) from first camera 10 to second camera 10S (S14, NO), first camera 10 continuously performs video recording, and the process of first camera 10 returns to Step S13. An example has been described in which first camera 10 is previously used for the video recording in Step S12 and the wearable camera used in the video recording after switching in Step S14 is second camera 10S. However, the procedure may be reversed, and the same is applied hereafter. That is, second camera 10S may be previously used for the video recording in Step S12, and the wearable camera used in the video recording after switching in Step S14 may be first camera 10.

After second camera 10S starts the video recording, MCU 19 detects a selection state of attribute selection switch SW4 of first camera 10 (S15), and determines the presence or absence of an input from attribute information assigning switch SW3 (S15).

If the input from attribute information assigning switch SW3 is present (S16, YES), MCU 19 reads attribute information corresponding to the selection state of attribute selection switch SW4 from EEPROM 16, and assigns the attribute information to the second video image data captured by second camera 10S (S17). MCU 19 outputs meta-information including the assigned attribute information to storage unit 15, and stores data by associating the meta-information with the video image data stored by completing the video recording operation immediately before (S18). According to the present embodiment, while second camera 10S performs imaging, the police officer OF may operate first camera 10 so as to assign the attribute information to the second video image data captured by second camera 10S. Alternatively, after second camera 10S completes the imaging, the attribute information may be assigned to the second video image data. The same is applied hereafter.

The meta-information includes event ID, time information (for example, imaging-start time of second camera 10S which is the wearable camera-switched time), camera ID, user ID, video recording camera information (for example, information on the wearable camera used for one-channel video recording), attribute information, and GPS information (refer to FIG. 28). In this manner, the operation of wearable camera system 100 according to the present embodiment is completed.

In addition, in the above-described example, the attribute information corresponding to the state of attribute selection switch SW4 is assigned from the attribute information which is previously allocated to attribute selection switch SW4. However, for example, a voice recognition function can also be used so as to assign the attribute information corresponding to a voice generated by a user.

As described above, according to wearable camera system 100, first camera 10 and second camera 10S which a user (for example, the police officer OF) can wear are used, and first camera 10 causes storage unit 15 to store the first video image data captured by first camera 10. When imaging of first camera 10 is switched to second camera 10S, second camera 10S transmits the second video image data captured by second camera 10S to first camera 10. When the imaging of first camera 10 is switched to second camera 10S, first camera 10 receives the second video image data transmitted from second camera 10S. If an operation for assigning the attribute information relating to the second video image data is received, first camera 10 assigns the attribute information to the second video image data in accordance with the assigning operation, and causes storage unit 15 to store the attribute information. First camera 10 deletes the first video image data captured by first camera 10 from storage unit 15.

In this manner, in order for a user (for example, the police officer OF) to accurately and broadly image a scene of accident where the user is dispatched for emergency, wearable camera system 100 deletes the first video image data which becomes unnecessary due to the switching when the imaging of first camera 10 is switched to second camera 10S. Through a simple operation on a single body of first camera 10, wearable camera system 100 can assign the attribute information indicating which type of video image is the second video image data to the second video image data which is captured by second camera 10S used after the switching. Therefore, wearable camera system 100 can assist the user (for example, the police officer OF) so as to accurately and broadly image a state of the scene of accident. Furthermore, wearable camera system 100 can improve handling convenience of the captured video image data (second video image data).

In addition, according to wearable camera system 100 of the present embodiment, when the imaging of second camera 10S is switched to first camera 10, second camera 10S transmits the second video image data captured until the imaging is switched to first camera 10 to first camera 10. When the imaging of second camera 10S is switched to first camera 10, first camera 10 receives the second video image data from second camera 10S, and discards the second video image data transmitted from second camera 10S. If an operation for assigning the attribute information relating to the first video image data is received, first camera 10 assigns the attribute information to the first video image data in accordance with the assigning operation, and causes storage unit 15 to store the attribute information.

In this manner, in order for the user (for example, the police officer OF) to accurately and broadly image the scene of accident where the user is dispatched for emergency, wearable camera system 100 discards the second video image data which becomes unnecessary due to the switching when the imaging of second camera 10S is switched to first camera 10. Through a simple operation on a single body of first camera 10, wearable camera system 100 can assign the attribute information indicating which type of video image is the first video image data to the first video image data which is captured by first camera 10 used after the switching. Therefore, wearable camera system 100 can assist the user (for example, the police officer OF) so as to accurately and broadly image a state of the scene of accident. Furthermore, wearable camera system 100 can improve handling convenience of the captured video image data (first video image data).

For this reason, the user (for example, police officer OF) can reliably assign attribute information to first video image data captured by first camera 10 or second video image data captured by second camera 10S by appropriately switching first camera 10 which is used for imaging after switching and second camera 10S even at an imaging field in an emergency situation. The first video image data or the second video image data which is captured before switching is deleted or discarded in first camera 10, and thus it is possible to prevent a storage capacity of first camera 10 from increasing. In a case of using video data accumulated in the server disposed in the back end system of the police station, a user (for example, a user of the back end system) can easily determine what kind of video data and extract the video data by referring to the attribute information assigned to the video data, and can easily identify when, where, with which camera, and by whom a video image was captured with which camera, and the content thereof, on the basis of meta information including the attribute information.

In addition, in the present exemplary embodiment, a wearable camera used to capture an imaging region (for example, a field) may be switched one of first camera 10 and second camera 10S to the other, and, in a state in which imaging is performed by one wearable camera (for example, first camera 10) in advance, imaging may be performed by the other wearable camera (for example, second camera 10S) which is added later (refer to FIGS. 30 and 31). FIG. 30 is a diagram illustrating a second example of the video-recorded image list. In description of FIG. 30, description of content overlapping the description of FIG. 28 will be omitted, and different content will be described. The video-recorded image list illustrated in FIG. 30 is different from the video-recorded image list illustrated in FIG. 28 in terms of video recording camera information.

Specifically, in a case of event IDs of "Event001" and "Event003", the video recording camera information is information indicating that imaging is performed by first camera 10 from beginning to end (refer to only the first camera). In this case, a camera ID is "BWC0001" indicating first camera 10.

In addition, in a case of an event ID of "Event002", the video recording camera information is information indicating that imaging is first performed by first camera 10, and second camera 10S is added on the way and is used for imaging (refer to the first camera +the second camera). In this case, in the event ID of "Event002", a camera ID is "BWC0001+BWC0002" indicating first camera 10 and second camera 10S.

Further, in a case of an event ID of "Event004", the video recording camera information is information indicating that imaging is first performed by first camera 10, and second camera 10S is added in the middle of the same video recording event and is used for imaging (refer to the first camera/the first camera +the second camera). In this case, in the event ID of "Event004", attribute information "overspeed" is assigned to first video image data which was captured by first camera 10 at "22:00:10, Dec. 2, 2014", and attribute information "drunken driving" is assigned to first video image data captured by first camera 10 and second video image data captured by second camera 10S at "22:10:50, Dec. 2, 2014". Therefore, in the event ID of "Event004", a camera ID defines both "BWC0001" indicating first camera 10 used before being added, and "BWC0001+BWC0002" indicating a combination of "BWC0001" indicating first camera 10 used after being added and "BWC0002" indicating second camera 10S.

Also in a case where first camera 10 first performs imaging and second camera 10S is added later, or in an opposite case, first camera 10 may assign different pieces of attribute information to first video image data captured by first camera 10 and second video image data captured by second camera 10S.

Next, with reference to FIG. 31, a description will be made of switching between wearable cameras used for simultaneous two-channel video recording (that is, video recording using first camera 10 and second camera 10S) and an operation of assigning common attribute information to two video recording data items obtained through the simultaneous two-channel video recording in the wearable camera system 100. FIG. 31 is a flow chart illustrating an example of an operational procedure of wearable camera system 100 in which video recording is switched over to simultaneous two-channel video recording and common attribute information is assigned to each piece of the video recording data video-recorded by each of the wearable cameras applied to the simultaneous two-channel video recording. In description of FIG. 31, description of content overlapping the description of FIG. 29 will be made briefly or will be omitted, and different content will be described.

In FIG. 31, after step S12 (that is, in a state in which video recording is performed by first camera 10), in a case where police officer OF connects second camera 10S to first camera 10 via cable CB in order to add a wearable camera for imaging a situation of an imaging region (for example, a field) (S21, YES), second camera 10S starts imaging. At this time, first camera 10 which is first used for imaging may stop the imaging according to the addition of second camera 10S, and may continuous to perform the imaging. Video data of moving images captured by second camera 10S is transmitted to first camera 10 via cable CB.

In a case where there is an input signal from attribute information assigning switch SW3 (S16, YES), MCU 19 reads attribute information corresponding to a selection state of attribute selecting switch SW4 from EEPROM 16, and assigns common attribute information (the attribute information corresponding to the selection state of attribute selecting switch SW4) to first video image data of moving images captured by first camera 10 until second camera 10S is connected to first camera 10, and second video image data of moving images captured by second camera 10S (S22).

After step S22, MCU 19 outputs meta information including the common attribute information to storage 15 so as to store the meta information in correlation with video data which is stored by finishing the video recording operation right before (S23). The meta information includes an event ID, timing information (for example, time when the wearable camera is added and time when imaging is started by second camera 10S), a camera ID, a user ID, video recording camera information (for example, information regarding the wearable cameras used for the simultaneous two-channel video recording), attribute information, and GPS information (refer to FIG. 31). Consequently, the operation of wearable camera system 100 according to the present exemplary embodiment is finished.

As mentioned above, in wearable camera system 100 of the present exemplary embodiment, first camera 10 stores the first video image data captured by first camera 10 in storage 15. In a case where first camera 10 first performs imaging, and then second camera 10S starts imaging, second camera 10S transmits the second video image data captured by second camera 10S to first camera 10. In a case where first camera 10 first performs imaging, and then second camera 10S starts imaging, first camera 10 receives the second video image data transmitted from second camera 10S. If an operation of assigning attribute information regarding the first video image data and the second video image data is received, first camera 10 assigns the common attribute information to the first video image data and the second video image data in response to the assigning operation, and stores a result thereof in storage 15.

Accordingly, in order to accurately and broadly capture an image of a situation at the scene where the user (for example, police officer OF) hurries in an emergency, when wearable camera system 100 starts to capture an image by using not only first camera 10 but also second camera 10S, wearable camera system 100 assigns the common attribute information indicating the types of the video images of the first video image data and the second video image data, to both of the first video image data obtained by original capturing, and the second video image data captured by second camera 10S used for capturing thereafter, by simple operation with respect to first camera 10. Accordingly, wearable camera system 100 can support the user (for example, police officer OF) to accurately and broadly capture an image of a situation at the scene, and further, can improve the convenience at the time of handling the captured video image data (the first video image data and the second video image data).

In addition, in wearable camera system 100 of the embodiment, when the capturing by second camera 10S is performed ahead, and the capturing by first camera 10 starts, second camera 10S transmits the second video image data captured by second camera 10S to first camera 10 before the capturing by first camera 10 starts. When the capturing by second camera 10S is performed ahead, and the capturing by first camera 10 starts, first camera 10 receives the second video image data transmitted from second camera 10S, and if the assigning operation of the attribute information relating to the first video image data captured by first camera 10 and the second video image data is received, first camera 10 assigns, according to the assigning operation, the common attribute information to the first video image data and the second video image data and stores the information in storage 15.

Accordingly, in order to accurately and broadly capture an image of a situation at the scene where a user (for example, police officer OF) hurries in an emergency, when wearable camera system 100 starts to capture an image by using not only second camera 10S but also first camera 10, wearable camera system 100 assigns the common attribute information indicating the types of the video images of the first video image data and the second image data, to both of the second video image data obtained by original capturing, and the first video image data captured by first camera 10 used for capturing thereafter, by simple operation with respect to first camera 10. Accordingly, wearable camera system 100 can support the user (for example, police officer OF) to accurately and broadly capture an image of a situation at the scene, and further, can improve the convenience at the time of handling the captured video image data (the first video image data and the second video image data).

Therefore, even in a case of a capturing scene in an emergency, the user (for example, police officer OF) can reliably assign the common attribute information to both of the video image data (for example, first video image data) captured by one camera (for example, first camera 10) used for capturing originally, and the video image data (for example, second video image data) captured by the other camera (for example, second camera 10S) used for capturing thereafter, by capturing an image by using both cameras from a state where capturing is performed by only using any one of first camera 10 and second camera 10S. In addition, when the video image data stored in the back-end system of the police station is used, by referring to the common attribute information assigned to the first video image data and the second video image data, the user (for example, a user of the back-end system) can easily distinguish the types of each piece of the video image data and extract the data. Further, the user can easily identify the video image (when, where, by which camera, and by whom the video image is captured and what kind of contents is contained).

In addition, since the attributes of the video image data can be easily assigned by first camera 10 with a simple operation by the user (for example, police officer OF), wearable camera system 100 can reduce time and labor when assigning the attribute information and also can easily identify the video image data immediately after the video recording.

In addition, first camera 10 receives the assigning operation of the attribute information relating to the first video image data or the second video image data through attribute information assigning switch SW3; receives the designating operation for the selection state of the attribute information through attribute selecting switch SW4; and assigns the attribute information corresponding to the selection state of attribute selecting switch SW4 to the first video image data, the second video image data, or both thereof. In this manner, first camera 10 assigns the attribute information selected by attribute selecting switch SW4 to the first video image data, the second video image data, or both thereof by the operation input of attribute information assigning switch SW3, so that it is possible to simplify the assigning operation of the attribute information by the simple operation of the user (for example, police officer OF) with respect to first camera 10. Accordingly, first camera 10 can reduce time and labor of the user (for example, police officer OF) when assigning the attribute information and also can easily identify the video image data immediately after the video recording.

In addition, in first camera 10, different pieces of attribute information are allocated to a plurality selection states in attribute selecting switch SW4. With this, first camera 10 can selectively determines attribute information that a user (for example, police officer OF) desires from a plurality of pieces of attribute information due to an operation of attribute selecting switch SW4, and can assign appropriate attributes to first video image data, second video image data, or both of the first video image data and the second video image data.

In addition, in wearable camera system 100 of the present exemplary embodiment, when first camera 10 and second camera 10S are connected via cable CB, imaging is performed by switching from one among first camera 10 and second camera 10S (for example, first camera 10) to the other (for example, second camera 10S), and when the connection of first camera 10 and second camera 10S via cable CB is cut off, imaging is performed by switching from the other among first camera 10 and second camera 10S (for example, second camera 10S) to the one (for example, first camera 10). With this, wearable camera system 100 can easily perform switching between first camera 10 and second camera 10S through a connection via cable CB or a cut-off of the connection.

In addition, in wearable camera system 100 of the present exemplary embodiment, when first camera 10 and second camera 10S are connected via cable CB, imaging is performed by both of first camera 10 and second camera 10S, and when the connection of first camera 10 and second camera 10S via cable CB is cut off, imaging is performed by any one (first camera 10 or second camera 10S) among first camera 10 and second camera 10S. With this, wearable camera system 100 can easily switch between combined use of imaging of first camera 10 and second camera 10S and cancellation thereof through a connection via cable CB or a cut-off of the connection.

Hereinabove, various exemplary embodiments are described with reference to drawings, but it is needless to say that the present invention is not limited to the examples. It is obvious for those skilled in the art to conceive various modification examples or revised examples within the scope of claims, and it is understood that those examples are accordingly within the technical scope of the present invention. Moreover, each of components in the exemplary embodiments may be arbitrarily combined without departing from the gist of the present invention.

What is claimed is:

1. A wearable camera, the camera comprising:
   an image sensor, which in operation, captures a video image of a scene;
   data storage, which in operation, stores data of the video image captured by the image sensor and attribute information, the attribute information being different from event identification, time information, camera identification, user identification and GPS information;
   a first attribute switch, which in operation, selects one among a plurality of pieces of attribute information, the pieces of attribute information being classification information identifying circumstances of a scene of an incident attended by a police officer and captured as video images by the image sensor, the selected attribute information being for assignment to data of video images captured by the image sensor; and a second attribute switch, wherein in response to operation of the second attribute switch performed between a start of capturing a video image and a start of a next capturing of a video image, the attribute information selected by operation of the first attribute switch is associated with the data of the video image which was currently being captured when the operation of the second attribute switch was performed or the data of the video image which was captured before the start of the next capturing of a video image, and wherein operation of the second attribute switch, after start of the next capturing of video images by the wearable camera, does not result in attribute information selected by operation of the first attribute switch being associated with the data of video images captured before the start of the next capturing of video images by the wearable camera.

2. The wearable camera of claim 1, further comprising:
data storage, which in operation, stores second data of a video image which is captured by another camera,
wherein operation of the first attribute switch selects one among the plurality of pieces of attribute information for assignment to the second data of a video image captured by the another camera.

3. The wearable camera of claim 1, wherein the classification information indicates a traffic accident, drunken driving, or speeding.

4. The wearable camera of claim 1, wherein in response to operation of the second attribute switch a plurality of times between a start of capturing a video image and a start of a next capturing of a video image, a plurality of the attribute information selected by operation of the first attribute switch is associated with the data of the video image which was currently being captured when the plurality of operations of the second attribute switch was performed or the data of the video image which was captured before the start of the next capturing of a video image.

5. A video recording method for a wearable camera that can be mounted on a user, the method comprising:
causing the wearable camera to capture video images of a scene;
storing data of the video images captured by the wearable camera and attribute information, the attribute information being different from event identification, time information, camera identification, user identification and GPS information;
selecting one among a plurality of pieces of attribute information by operation of a first attribute switch, the plurality of pieces of attribute information being classification information identifying circumstances of a scene of an incident attended by a police officer and captured as video images by the wearable camera;
operating a second attribute switch between a start of capturing the video images by the wearable camera and a start of a next capturing of video images by the wearable camera, operation of the second attribute switch between the start of capturing the video images by the wearable camera and the start of a next capturing of video images by the wearable camera causing the attribute information selected by operation of the first attribute switch to be associated with the video images being captured when the operation of the second attribute switch is performed or the video images captured before the start of the next capturing of video images; and
operating the second attribute switch after the start of a next capturing of video images by the wearable camera, operation of the second attribute switch after the start of a next capturing of video images by the wearable camera not resulting in attribute information selected by operation of the first attribute switch being associated with the video images captured before the start of a next capturing of video images by the wearable camera.

6. The method of claim 5, further comprising storing second data of a video image captured by another camera and assigning attribute information to the second data of a video image captured by the another camera.

7. The method of claim 5, wherein the classification information indicates a traffic accident, drunken driving, or speeding.

8. The video recording method of claim 5, further comprising in response to operation of the second attribute switch a plurality of times between a start of capturing a video image by the wearable camera and a start of a next capturing of a video image by the wearable camera, causing a plurality of the attribute information selected by operation of the first attribute switch to be associated with the data of the video image being captured when the plurality of operations of the second attribute switch was performed or the data of the video image captured before the start of the next capturing of video images.

* * * * *